US007705901B2

(12) United States Patent
Kobayashi

(10) Patent No.: US 7,705,901 B2
(45) Date of Patent: Apr. 27, 2010

(54) IMAGE PICKUP APPARATUS INCLUDING PHOTOSENSITIVE CELLS EACH HAVING PHOTOSENSITIVE REGIONS PARTITIONED

(75) Inventor: Hirokazu Kobayashi, Asaka (JP)

(73) Assignee: Fuifilm Corporation, Tokyo (JP)

( * ) Notice: Subject to any disclaimer, the term of this patent is extended or adjusted under 35 U.S.C. 154(b) by 1082 days.

(21) Appl. No.: 11/231,882

(22) Filed: Sep. 22, 2005

(65) Prior Publication Data

US 2006/0066739 A1 Mar. 30, 2006

(30) Foreign Application Priority Data

Sep. 24, 2004 (JP) ............................. 2004-278405
May 6, 2005 (JP) ............................. 2005-135183

(51) Int. Cl.
*H04N 5/335* (2006.01)
(52) U.S. Cl. ...................................... 348/315; 348/316
(58) Field of Classification Search ................. 348/302, 348/303, 304, 305, 311, 315, 316, 317, 319, 348/320, 321, 322, 323
See application file for complete search history.

(56) References Cited

U.S. PATENT DOCUMENTS

| | | | | |
|---|---|---|---|---|
| 4,963,980 A | * | 10/1990 | Suga et al. ............... | 348/220.1 |
| 5,293,240 A | * | 3/1994 | Matsunaga ................. | 348/312 |
| 6,236,434 B1 | | 5/2001 | Yamada | |
| 6,819,360 B1 | * | 11/2004 | Ide et al. ..................... | 348/340 |
| 6,919,551 B2 | * | 7/2005 | Barna et al. ............. | 250/214 R |
| 7,095,441 B2 | * | 8/2006 | Nagano ...................... | 348/308 |
| 7,190,403 B2 | * | 3/2007 | Yamashita et al. .......... | 348/364 |
| 2001/0010553 A1 | * | 8/2001 | Tanaka et al. ............... | 348/311 |
| 2003/0141564 A1 | * | 7/2003 | Kondo et al. ................. | 257/442 |
| 2004/0017498 A1 | * | 1/2004 | Yamashita et al. .......... | 348/315 |

FOREIGN PATENT DOCUMENTS

JP 2003-32549 1/2003

* cited by examiner

*Primary Examiner*—Jason Chan
*Assistant Examiner*—Nicholas G Giles
(74) *Attorney, Agent, or Firm*—McGinn IP Law Group, PLLC

(57) ABSTRACT

In an image pickup apparatus, photosensitive devices each are allocated to particular one of pixels bidimensionally arranged on a photosensitive cell array and is divided into two photosensitive regions having substantially equal photosensitive area. Signal charges stored in the two photosensitive regions each are transferred over particular one of vertical transfer paths arranged at both sides of the photosensitive regions. The signal charges are read out in an interlace read mode such that in a first field signal charges are read out from pixels corresponding to green, and in a second field signal charges are read out from pixels corresponding to red and blue.

17 Claims, 20 Drawing Sheets

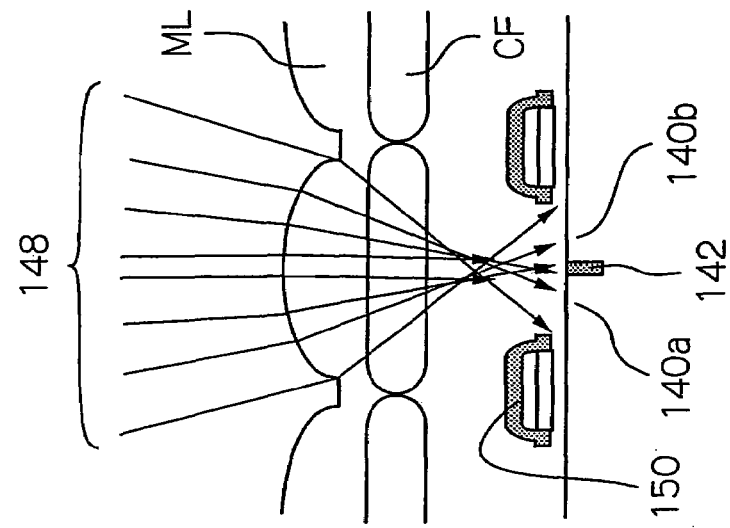
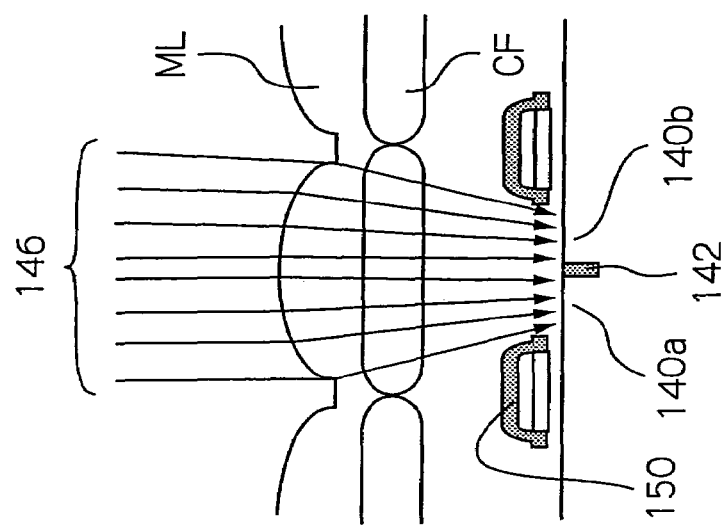
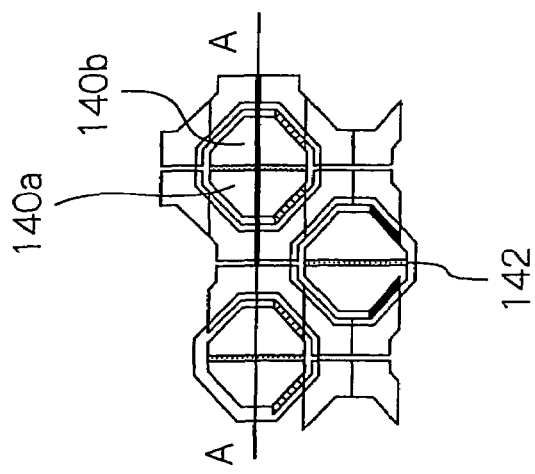

Fig. 4A  H1
Fig. 4B  H2
Fig. 4C  Reset
Fig. 4D  Reset
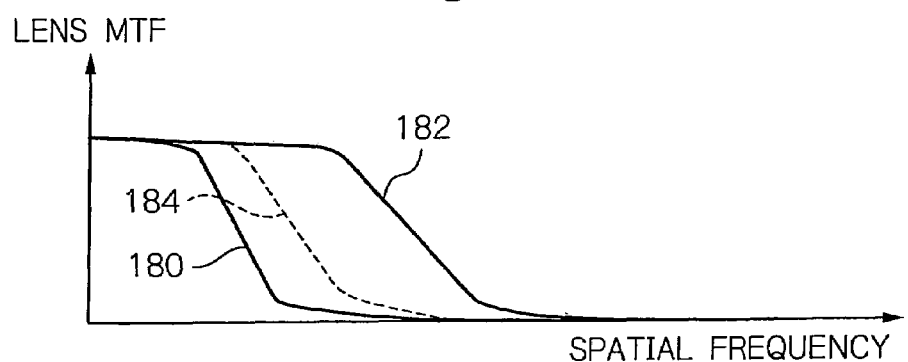
Fig. 5
Fig. 6A  MS
Fig. 6B  VD
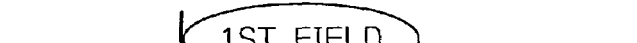
Fig. 6C  TG1, TG5
Fig. 6D  TG3, TG7
Fig. 6E  TG2, TG6, TG4, TG8

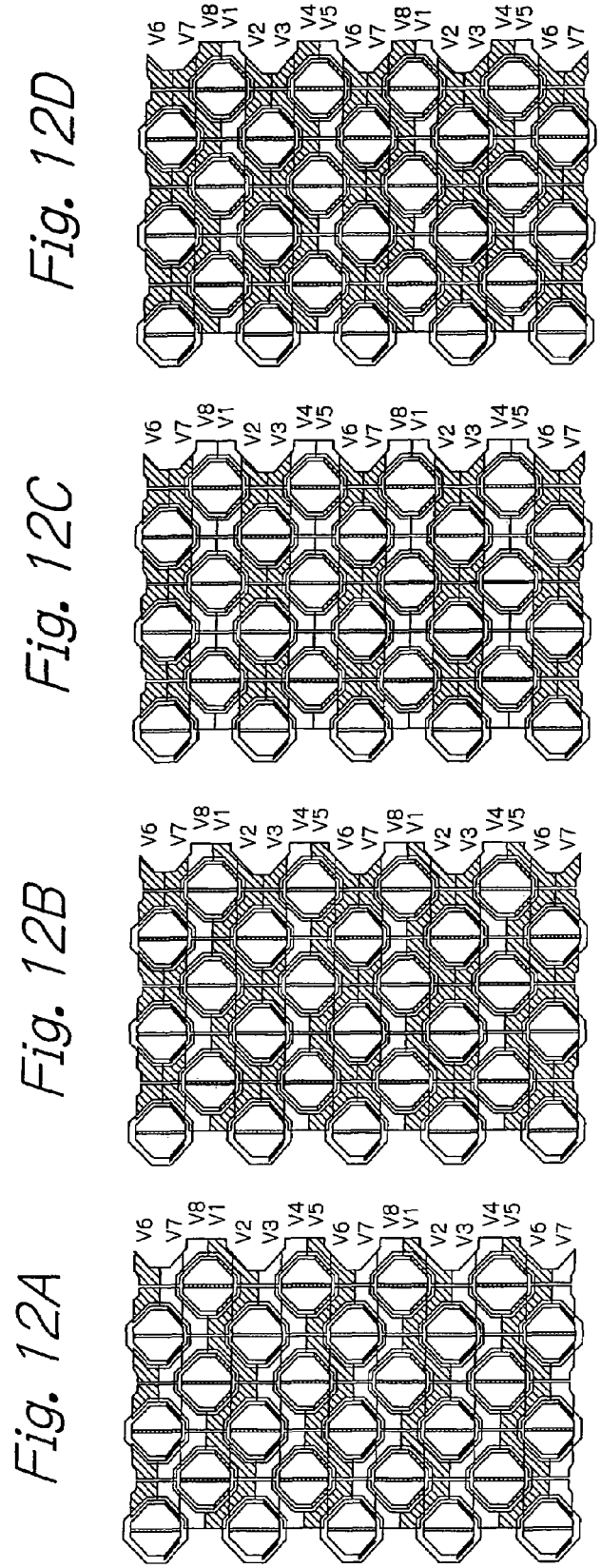

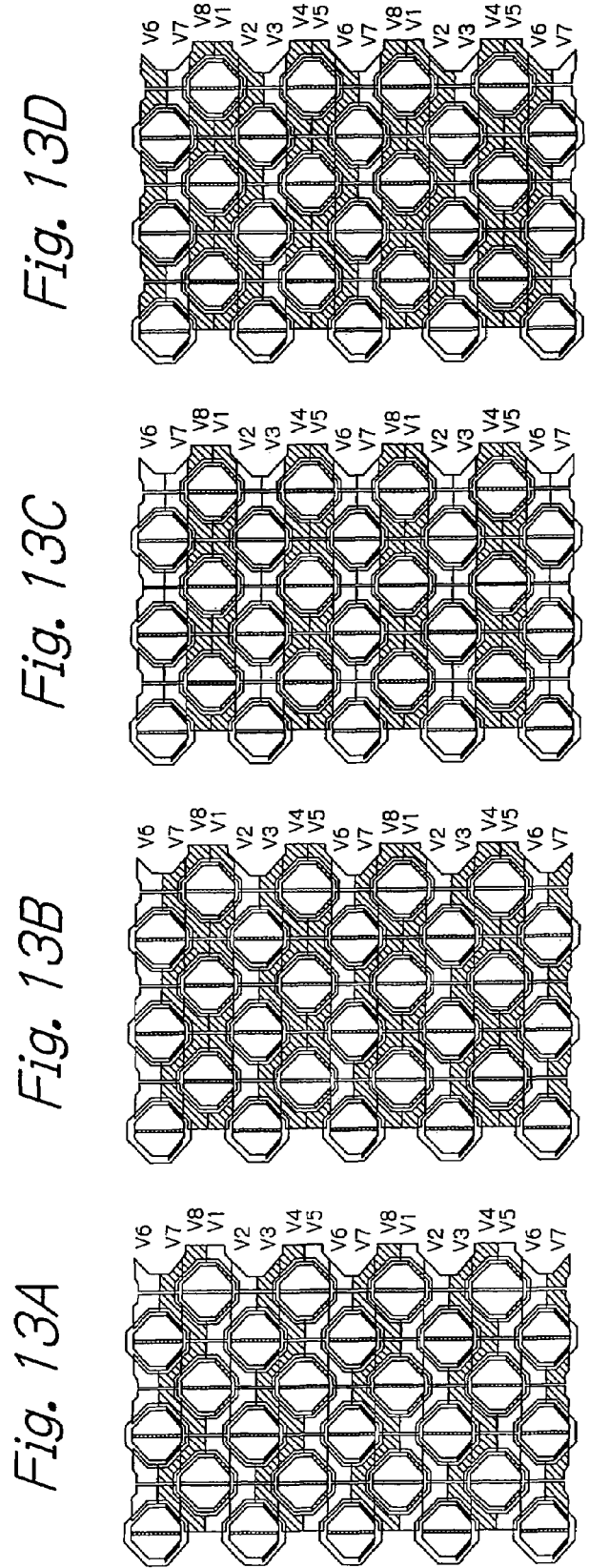

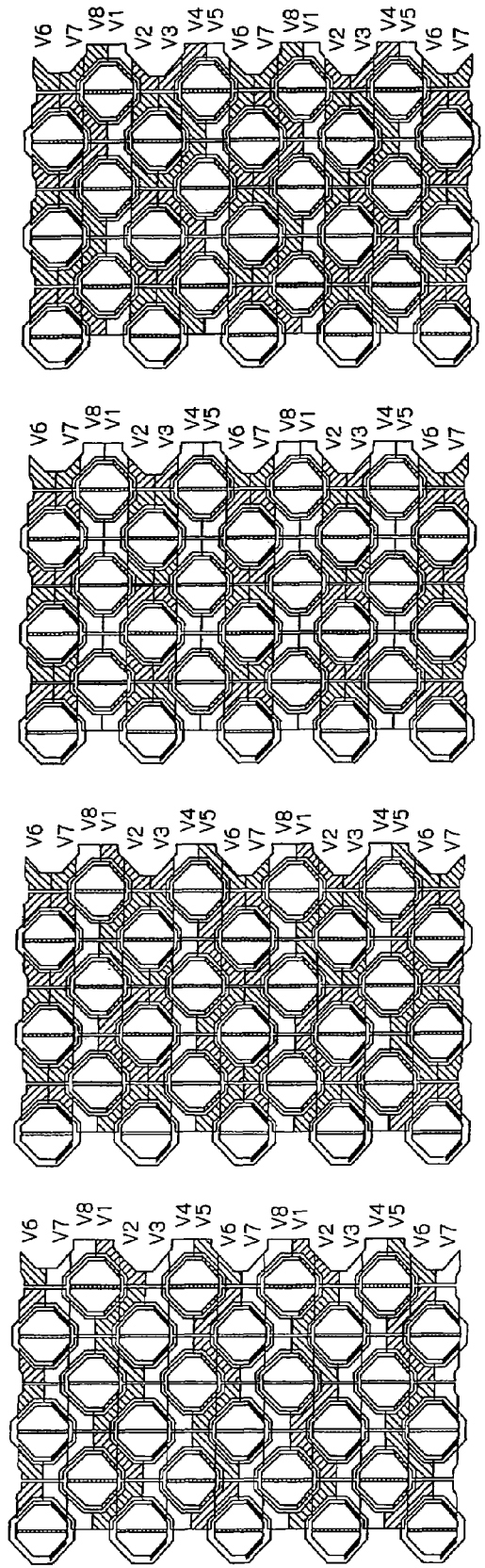

IMAGE PICKUP APPARATUS INCLUDING PHOTOSENSITIVE CELLS EACH HAVING PHOTOSENSITIVE REGIONS PARTITIONED

BACKGROUND OF THE INVENTION

1. Field of the Invention

The present invention relates to a solid-state image pickup apparatus for transforming incident light to a corresponding electric signal for picking up the image of a desired field, and more particularly to a solid-state image pickup apparatus for producing multiple fields of image signals without resorting to an overflow drain (OFD) modulation or similar control. The present invention is desirably applicable to, e.g., an electronic still camera, an image input apparatus, a movie camera or a cellular phone by way of example.

2. Description of the Background Art

Conventional solid-state image pickup apparatuses include an electronic still camera of the type having a mechanical shutter and operable in an interlace read mode, which is capable of transferring a greater amount of signal charges than a progressive read mode. In order to make up for a decrease in the number of electrons ascribable to the higher density of pixels of a photosensitive cell array to cause its pixel size to decrease, a current trend with this type of image pickup apparatus is toward the configuration for producing multiple fields of image signals, so-called the multiple field configuration. The multiple field configuration involves however a problem that signal charges reserved for forming a second and a third field are stored in the photodiodes of the photosensitive array for a long period of time after the closure of the mechanical shutter. As a result, such signal charges are apt to decrease or deteriorate due to thermal saturation diffusion.

In light of the above, it is a common practice to execute OFD modulation with a method taught in, e.g., U.S. patent application publication No. US 2001/0010553 A1 for thereby increasing the amount of signal charge to remain at the end of exposure. More specifically, the above method controllably drives a CCD (Charge Coupled Device) image sensor by lowering an OFD voltage during exposure in order to increase the amount of charge to be stored, thereby canceling a decrease in the amount of stored signal charge ascribable to thermal saturation diffusion that would occur after the mechanical shutter has been closed on the elapse of exposure time. This method is generally considered to effectively accomplish the multiple field configuration.

Japanese patent laid-open publication No. 2003-32549 proposes to execute OFD modulation in a progressive read mode with a CCD image sensor, which is usable for both of an interlace read mode and a progressive read mode.

The problem with the two prior art schemes described above is that control over the OFD voltage is essential and makes control over image sensing devices sophisticated.

SUMMARY OF THE INVENTION

It is an object of the present invention to provide a solid-state image pickup apparatus capable of increasing the saturation amount of charge without resorting to OFD modulation or similar control.

It is another object of the present invention to provide a solid-state image pickup apparatus capable of being provided with a progressive reading function in addition to an interlace reading function in case an ultrahigh-speed electronic shutter is required. In this respect, a further object of the present invention is to provide a solid-state image pickup apparatus obviating the need for OFD modulation in the case of progressing reading, which is taught in Japanese patent laid-open publication 2003-32549 mentioned previously, and capable of performing progressive reading even when ISO (International Standards Organization) sensitivity is low, i.e., when the iris diaphragm of a camera is its full open state.

An image pickup apparatus of the present invention includes a plurality of photosensitive devices arranged one-to-one correspondence to a plurality of pixels bidimensionally arranged on a photosensitive cell array, each of photosensitive devices comprising a plurality of photosensitive regions having substantially the same photosensitive area. A plurality of first transfer paths transfer signal charges stored in the plurality of photosensitive regions. At least two of the plurality of photosensitive regions of each photosensitive device each are connected to a particular first transfer path, whereby signal charges stored in the at least two photosensitive regions each are transferred over the particular first transfer path.

Also, an image pickup apparatus of the present invention includes a plurality of photosensitive devices arranged one-to-one correspondence to a plurality of pixels bidimensionally arranged on a photosensitive cell array, each of photosensitive devices comprising a plurality of photosensitive regions capable of storing substantially the same amount of charge. A plurality of first transfer paths transfer signal charges stored in the plurality of photosensitive regions. At least two of the plurality of photosensitive regions of each photosensitive device each are connected to particular one of the plurality of first transfer paths, whereby signal charges stored in the at least two photosensitive regions each are transferred via the particular first transfer path.

Further, an image pickup apparatus of the present invention includes a plurality of photosensitive devices arranged one-to-one correspondence to a plurality of pixels bidimensionally arranged on a photosensitive cell array, each of photosensitive devices comprising a plurality of photosensitive regions, at least one of which has a smaller photosensitive area than at least another of the photosensitive regions. In an interlace read mode, signal charges stored in the photosensitive region having the smaller photosensitive area and the photosensitive region having the larger photosensitive area are sequentially read out in this order in a first field and a second field, respectively. A plurality of first transfer paths transfer signal charges stored in the plurality of photosensitive regions. At least two of the plurality of photosensitive regions of each photosensitive device each are connected to particular one of the first transfer paths, whereby signal charges stored in the at least two photosensitive regions each are transferred via the particular first transfer path.

Moreover, an image pickup apparatus of the present invention includes a plurality of photosensitive devices arranged one-to-one correspondence to a plurality of pixels bidimensionally arranged on a photosensitive cell array, each of photosensitive devices comprising a plurality of photosensitive regions, at least one of which has a capacity to store a greater amount of charge than at least another of the photosensitive regions. In an interlace read mode, signal charges stored in the photosensitive region storing the smaller amount of charge and the photosensitive region storing the greater amount of charge are sequentially read out in this order in a first field and a second field, respectively. A plurality of first transfer paths transfer signal charges stored in the plurality of photosensitive regions. At least two of the plurality of photosensitive regions of each photosensitive device each are connected to particular one of the plurality of first transfer paths, whereby signal charges stored in the at least two photosensitive regions each are transferred via the particular first transfer path.

BRIEF DESCRIPTION OF THE DRAWINGS

The objects and features of the present invention will become more apparent from consideration of the following detailed description taken in conjunction with the accompanying drawings in which:

FIGS. 3A, 3B and 3C demonstrate horizontal pixel mixture unique to the illustrative embodiment;

FIGS. 4A through 4D are timing charts showing reset pulses used to execute pixel mixture on a horizontal transfer path also included in the illustrative embodiment;

FIG. 5 plots a relation between a lens MTF (Modulation Transfer Function) and spatial frequency;

FIGS. 6A through 6E are timing charts showing pulses to be applied to signal read gates included in the illustrative embodiment in an interlace read mode;

FIGS. 12A through 15D each show a particular condition in which signal charges are transferred on a plurality of vertical transfer paths;

DESCRIPTION OF THE PREFERRED EMBODIMENTS

Figure 1:
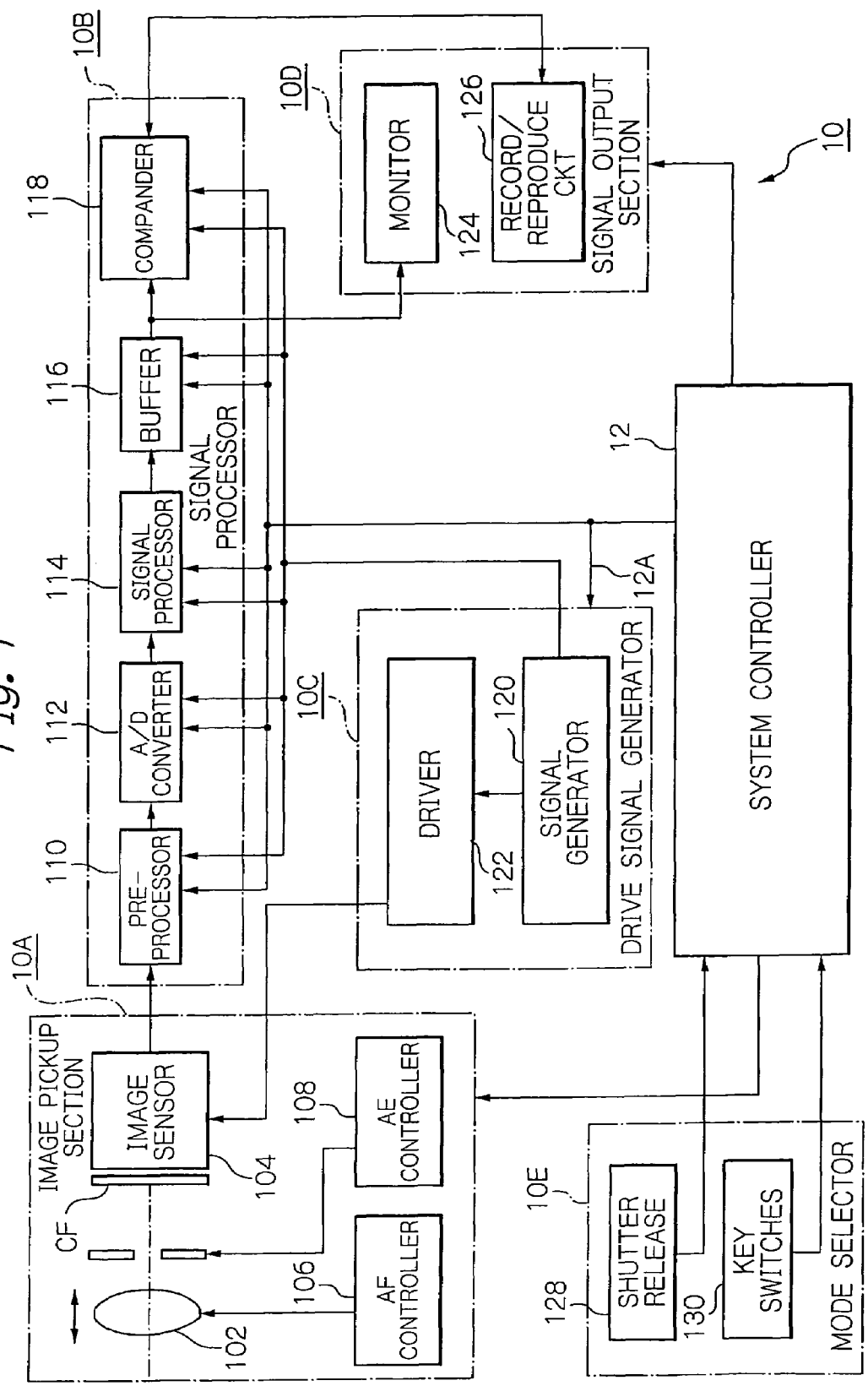
FIG. 1 is a schematic block diagram showing a preferred embodiment of the solid-state image pickup apparatus in accordance with the present invention.

Referring to FIG. 1 of the accompanying drawings, a solid-state image pickup apparatus embodying the present invention is implemented as a digital still camera by way of example. As shown, the digital still camera, generally 10, is generally made up of an image pickup section 10A, a signal processor 10B, a drive signal generator 10C, a signal output section 10D, a mode selector 10E and a system control 12.

The image pickup section 10A includes a lens system 102, an image sensor 104, an automatic focus (AF) controller 106 including a focus control mechanism, an automatic exposure (AE) controller 108 including an aperture or iris control mechanism, and a color filter CF. A shutter mechanism, not shown, is positioned at the light-incidence side of the image sensor 104 for fully intercepting input light. The lens system 102 is representative of optics for focusing light input from the objective field on the photosensitive cell array or surface of the image sensor 104.

The arrangement of the image sensor 104 unique to the illustrative embodiment will be described specifically with reference to FIG. 2 hereinafter. As shown, the image sensor 104 includes photosensitive devices or cells such as photodiodes 140 arranged in rows and columns to constitute an array of photosensitive cells and each being located at the position of a particular pixel for effecting photoelectric transduction. Also shown in FIG. 2 are color filter segments, microlenses ML, transfer gates or signal read gates TG, and vertical transfer paths 144a and 144b on which transfer electrodes or transfer elements of devices V1 through V8 are arranged.

Figure 2:
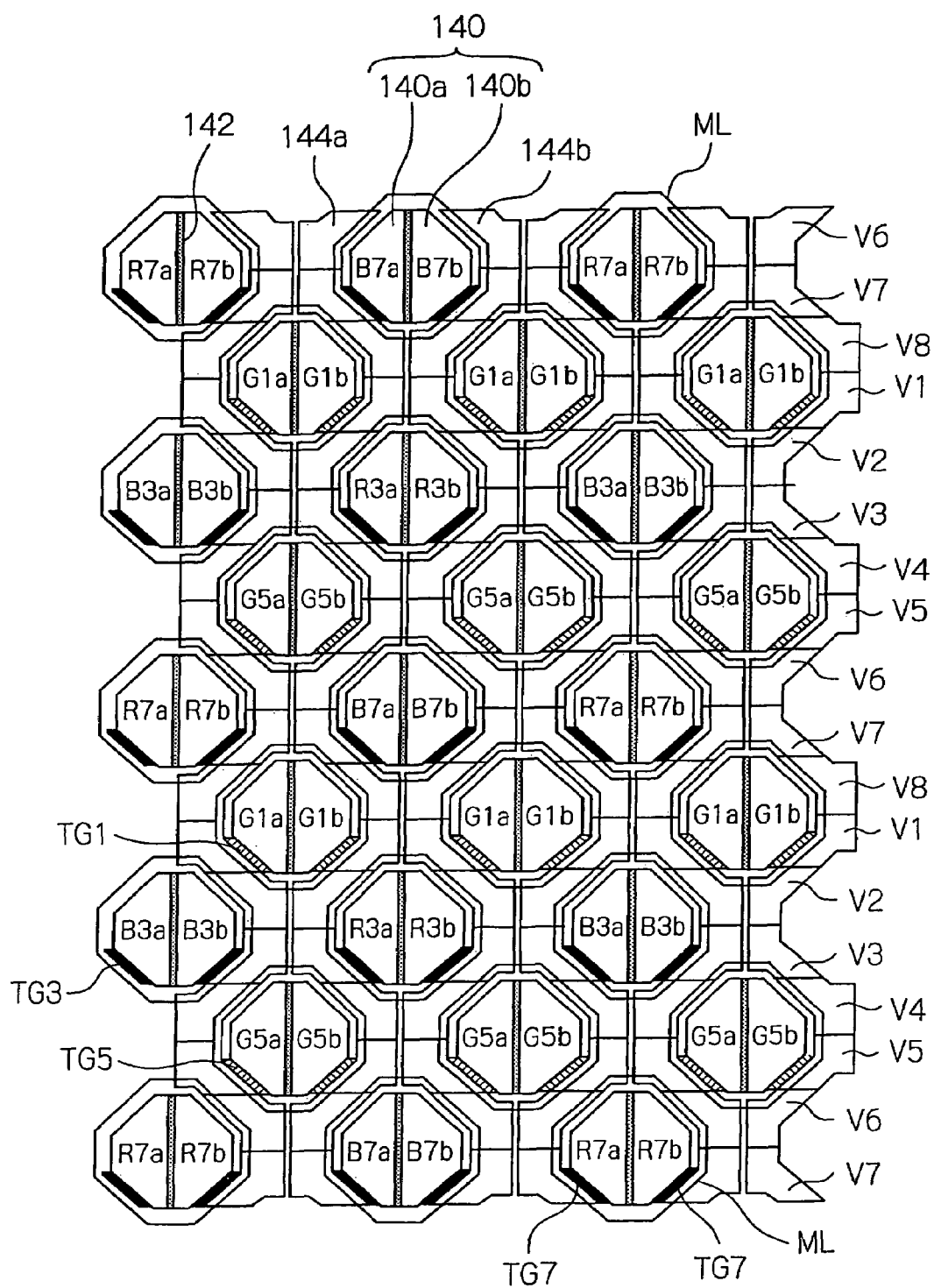
FIG. 2 is a fragmentary plan view showing part of the arrangement of photosensitive devices, color filter segments and vertical transfer paths included in the illustrative embodiment, viewed on the light-incidence side.

More specifically, as shown in FIG. 2, each photosensitive device or cell 140 has its photosensitive area divided into two photosensitive regions 140a and 140b by a divider 142 in the transfer direction of the vertical transfer paths 144a and 144b, i.e., in the up-and-down direction in the figure. The photosensitive regions 140a and 140b of each photosensitive cell 140 have substantially the same area as each other. In the illustrative embodiment, the cells 140 are arranged in a so-called honeycomb pattern. A single color filter segment, also labeled CF, is positioned on the light incident side of each photosensitive cell 140 while a single microlens ML is positioned on the color filter segment CF. The color filter segment CF is formed integrally with the photosensitive cell 140.

The color filter segments CF separate light incident thereon to a red (R), a green (G) and a blue (B) components, i.e., three primary-color components and cause them to be incident on the corresponding photosensitive cells 140. In FIG. 2, the R, G and B filter segments CF and therefore photosensitive cells 140 associated therewith are distinguished from each other by R, G and B. It is to be noted that numbers 1, 3, 5 and 7, included in the labels attached to the photosensitive cells G1, R3, G5 and B7, respectively correspond to the numbers attached to the transfer electrodes V1, V3, B5 and V7, which will be described in detail later.

In the illustrative embodiment, the G filter segments CF are arranged on every other column that does not include any R or B filter segment. On the other hand, the R and B filter segments CF alternate each other on each column between nearby G filter segment columns as well as on each row. The arrangement of the R, G and B filter segments CR shown in FIG. 2 is generally referred to as a G-stripe, RB-full checkerboard pattern.

The image sensor 104 will be described more specifically hereinafter. The image sensor 104 is driven by various drive signals output from the drive signal generator 10C, FIG. 1. Between each of the photosensitive regions 140a and 140b and a transfer device or vertical transfer device adjoining the portion 140a or 140b, a single transfer gate TG is formed in order to read out a signal charge transformed from incident light to the transfer device.

More specifically, the transfer gates TG each are positioned between a particular photosensitive region 140a or 140b and the vertical transfer path 144a or 144b adjoining it. In this configuration, an interlace read mode operation is executed to read out, in a first field, signal charges from all the photosensitive regions G1a, G1b, G5a and G5b located at the positions of green pixels and then read out, in a second field, signal charges from the photosensitive regions R3a, R3b, R7a, R7b, B3a, B3b, B7a and B7b located at the positions of the red and blue pixels. The interlace read mode effected in the illustrative embodiment will be described in more detail later.

An interlace read mode is advantageous over a progressive read mode, which is another reading system applicable to an image pickup system with a honeycomb arrangement, in that it reduces the width of each vertical transfer path 144a or 144b and therefore implements a layout that provides each photosensitive region with a larger area, thereby broadening the dynamic range of the digital still camera 10. The divider 142 of each photosensitive device or photoconductor 140 divides the pixel at substantially the center of the image sensing device 140, so that signal charges to flow out to the vertical transfer paths 144a and 144ab via the respective transfer gates TG are substantially equal in area to each other.

Signal charges generated and stored in the photosensitive regions 140a and 140b of each photosensitive devices or pixels 140 are transferred to the vertical transfer paths 144a and 144b, respectively, via the transfer gates TG in response to field shift pulses selectively applied to the electrodes V1 through V8. The vertical transfer paths 144a and 144b are constituted by charge-coupled devices (CCDs). Such vertical transfer executes the horizontal-line shift of the signal charges for thereby transferring the signal charges to a horizontal transfer path, not shown, which is formed by transfer gates arranged in a row. The horizontal transfer path sequentially outputs the above signal charges in the horizontal direction to the signal processor 10, FIG. 1, via an output amplifier or floating diffusion amplifier (FDA) not shown.

An interlace read mode will be described in detail with reference to FIGS. 6A through 6E hereinafter. As shown, at the time when signal charges stored in the photosensitive regions 140a and 140b are read out, the signal generator 120, see FIG. 1, generates a signal MS for closing the mechanical shutter; the signal MS goes low when the mechanical shutter should be closed. At the same time, the signal generator 120 generates a vertical synchronous signal VD synchronous to the signal MS.

Further, the signal generator 120 outputs vertical timing signals TG1 through TG8 in synchronism with the vertical synchronous signals VD. The vertical timing signals TG1 through TG8 are fed to the transfer gates TG via the electrodes or transfer devices V1 through V8, respectively. More specifically, in FIGS. 6A through 6E, in each vertical synchronizing period, the vertical timing signals TG1 and TG5 go high in the first field while the vertical timing signals TG3 and TG7 go high in the second field. The other vertical timing signals TG2, TG6, TG4 and TG8 are constantly maintained in the low level thereof. More specifically, the vertical timing signals TG1, TG3, TG5 and TG7 are so generated as to read out signal charges in synchronism with the vertical synchronous signal VD.

Figure 7A:
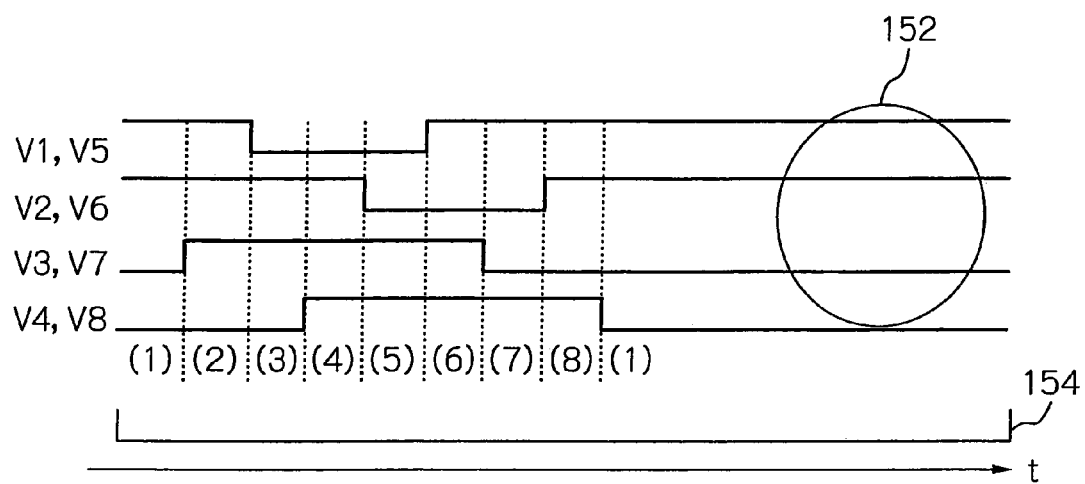
FIGS. 7A and 7B are timing charts showing pulses to be applied to vertical transfer electrodes in the interlace read mode.
Figure 7B:
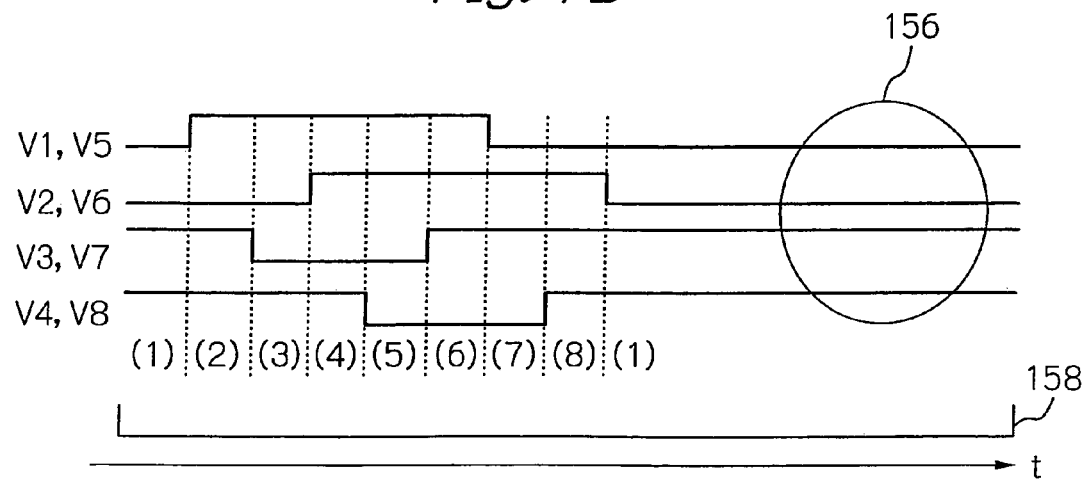

As shown in FIGS. 7A and 7B, the signal generator 120 further generates the vertical drive signals V1 through V8 to be respectively fed to the transfer devices V1 through V8 of the vertical transfer paths 144a and 144b in synchronism with the vertical synchronous signal VD. More specifically, as shown in FIG. 7A, when the transfer gates TG are to be turned on in the first field, signal charges are read out from only the photosensitive devices 140 corresponding in position to the transfer devices V1 and V5, i.e., a field shift is effected. Such a field shift is not repeated until the next vertical synchronous signal VD has been fed. After the above field shift, the vertical drive signals V1 through V8 are sequentially fed to the transfer devices V1 through V8, respectively, with the result that the signal charges shifted to the vertical transfer paths 144a and 144b are transferred toward the horizontal transfer path.

Upon the elapse of consecutive times (1) through (8), the signal charges read out from the transfer devices V1 are transferred to the positions of the transfer devices V5 adjoining them in the vertical direction, i.e., transferred by one line in the vertical direction. At this time, the vertical drive signals V1 through V8 hold their existing statuses. On the other hand, horizontal transfer 152 of the signal charges occurs on the horizontal transfer path. After the horizontal transfer 152, the vertical drive signals V1 through V8, FIG. 7A, are again sequentially fed in order to effect transfer by another line. In this manner, signals, appearing in a section 154, are repeatedly applied over the period of time of the first field.

As shown in FIG. 7B, in the second field, signal charges are read out from only the photosensitive devices corresponding to the transfer devices V3 and V7 when the transfer gates are turned on. After a field shift, vertical drive signals V1 through V8 shown in FIG. 7B are sequentially fed. On the elapse of consecutive times (1) through (8), the signal charges read out from the transfer devices V3 are transferred to the positions of the transfer devices V7 adjoining them in the vertical direction. At this time, the vertical drive signals V1 through V8 hold their existing statuses. Upon the elapse of horizontal transfer 156, the vertical drive signals V1 through V8, FIG. 7B, are again sequentially fed in order to effect transfer by another line. In this manner, signals, appearing in a section 158, are repeatedly applied over the duration of the second field.

Figure 8:
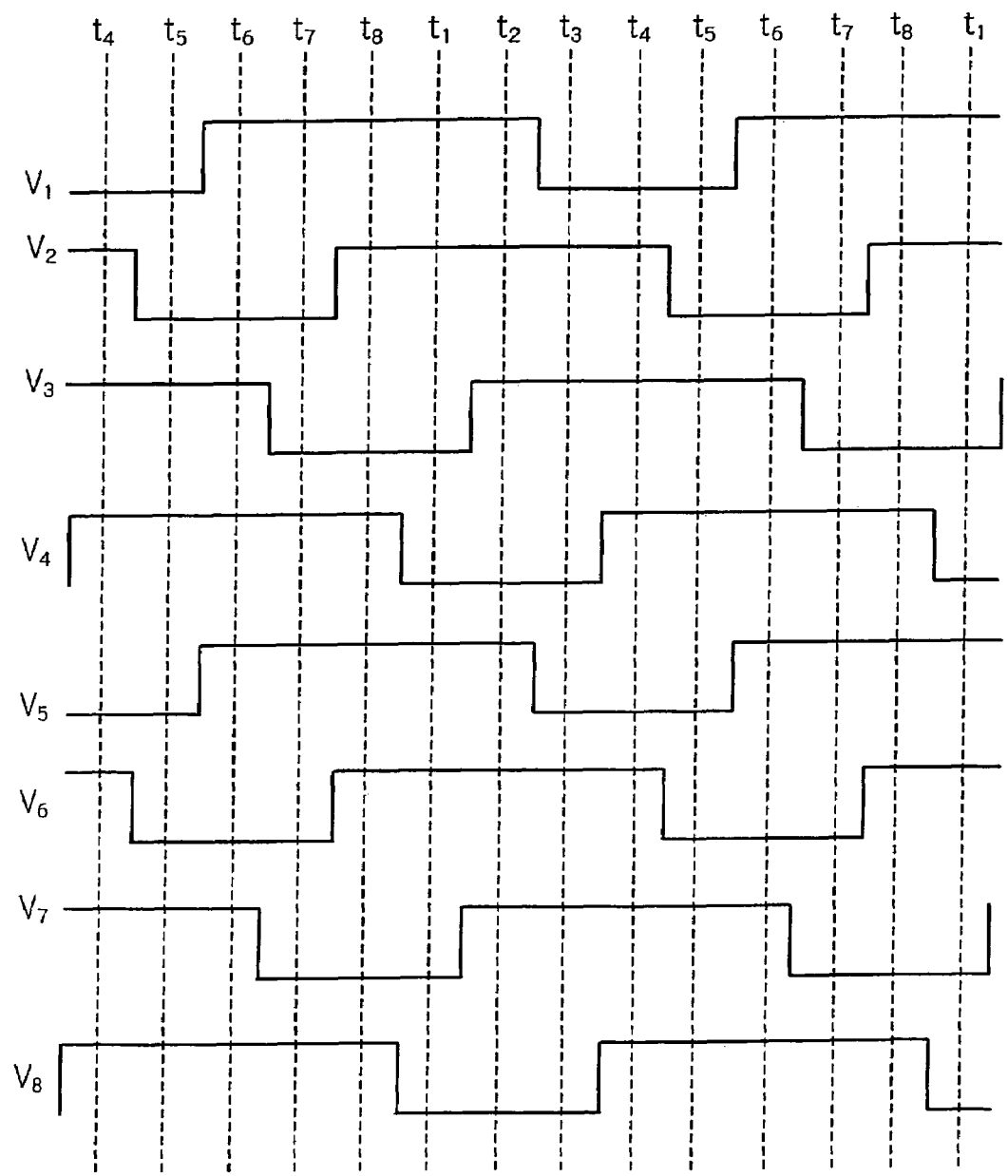
FIG. 8 shows the pulses shown in FIG. 7A more specifically.

FIG. 8 shows, in an enlarged scale with respect to time, the vertical drive signals V1 through V8 appearing in the first field after a time $t_0$ at which the vertical synchronous signal VD has gone high to cause signal charges to be read out to the vertical transfer path 144. Likewise, FIG. 10 shows the vertical drive signals V1 through V8 appearing in the second field after the time $t_0$.

As shown, the vertical drive signals V1 through V8 are applied at a time $t_1$, which follows the time $t_0$, to a time $t_8$. It should be noted that the times $t_1$ through $t_8$ are representative of times between the consecutive times (1) through (8) shown in FIGS. 7A and 7B. In FIGS. 8 and 10, the horizontal transfer periods 162 and 156 are not shown. The drive signals V1 through V8 each are applied to every eighth transfer device. Stated another way, every eighth transfer device shown in FIG. 2 are connected to the same electrode.

Figure 9:
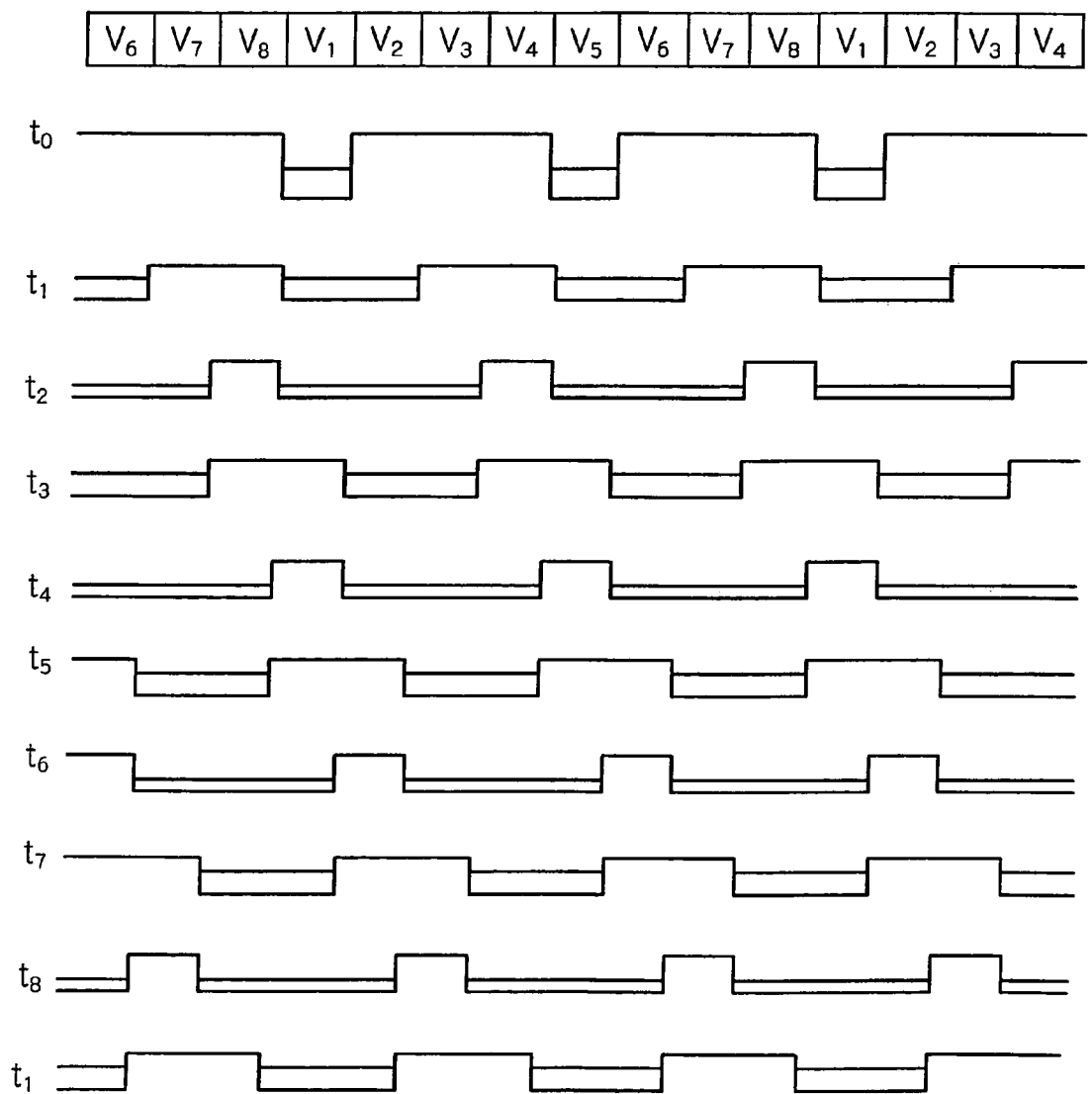
FIG. 9 shows potentials generated in a vertical transfer path when the pulses of FIG. 8 are applied.
Figure 10:
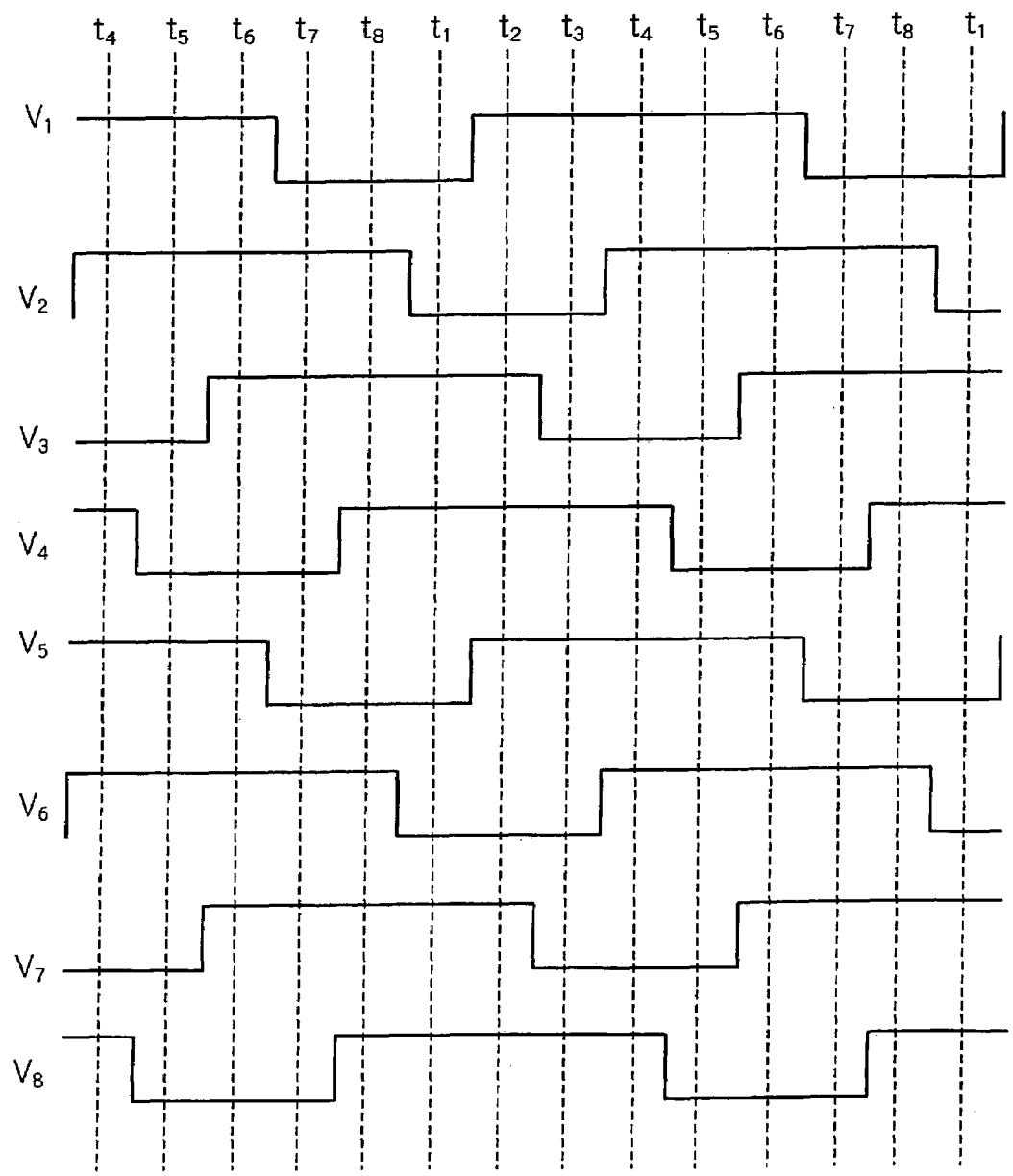
FIG. 10 shows the pulses shown in FIG. 7B more specifically.
Figure 11:
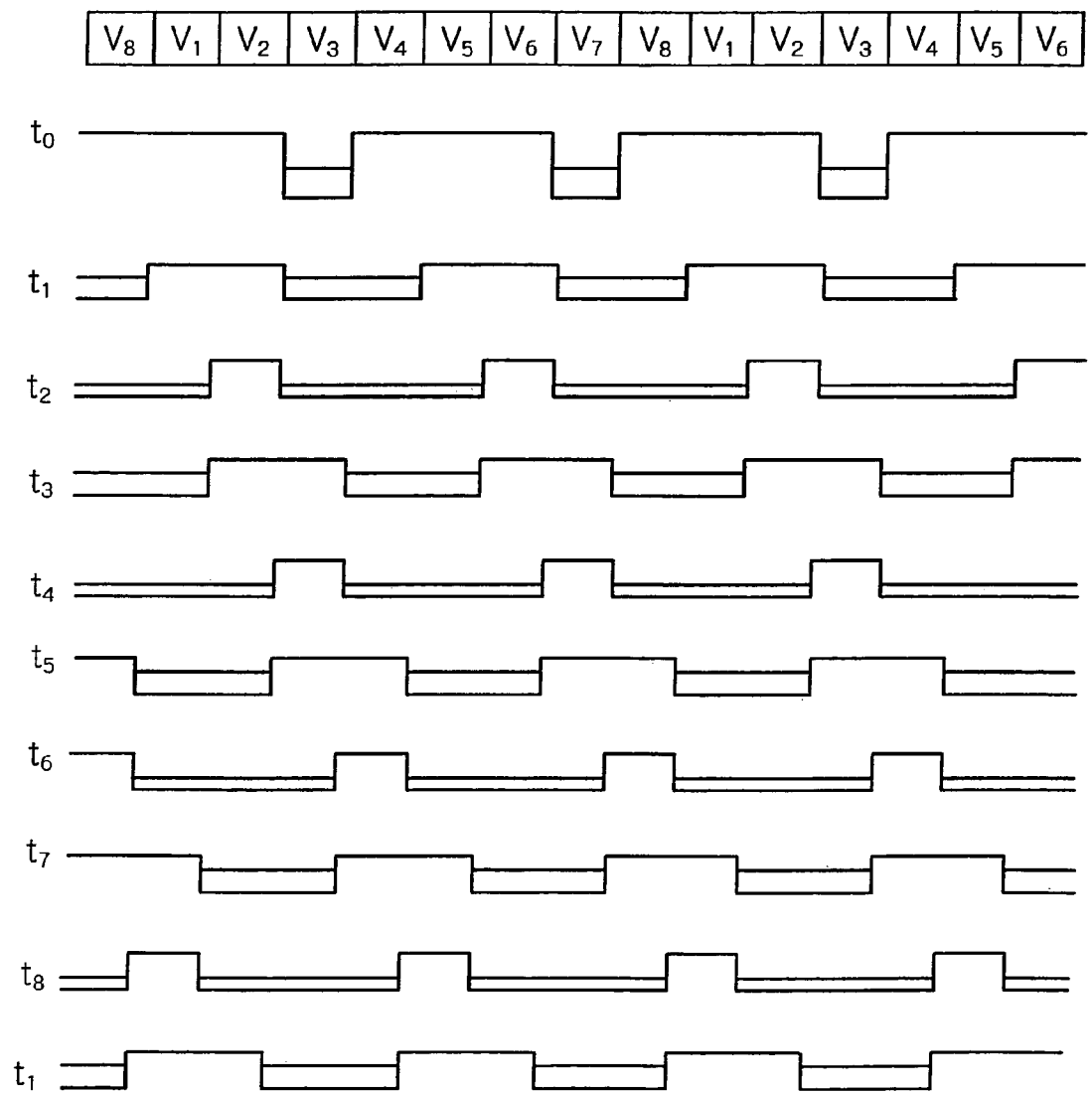
FIG. 11 is a timing chart showing potentials generated in the vertical transfer path when the pulses of FIG. 10 are applied.
Figure 14A:
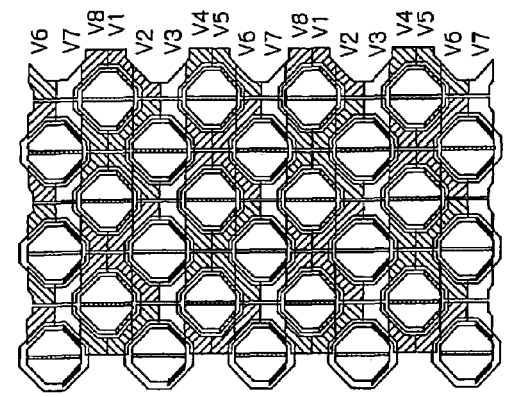
Figure 14B:
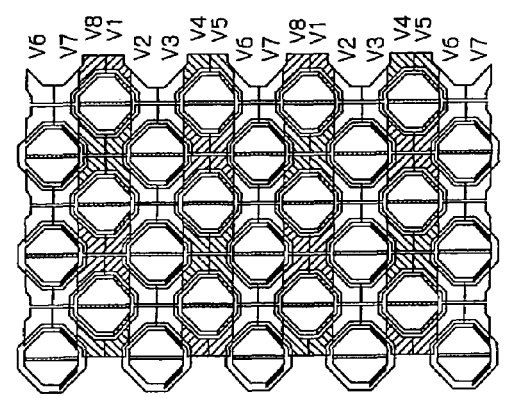
Figure 14C:
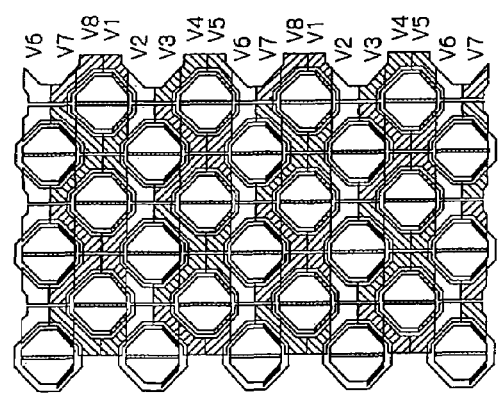
Figure 14D:
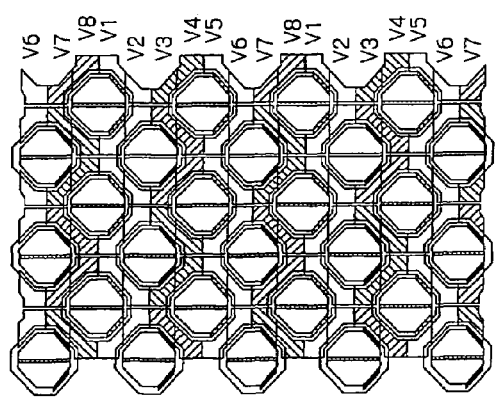

FIGS. 9 and 11 correspond to FIGS. 8 and 10, respectively, and each show potentials formed in the vertical transfer devices V1 through V8 when the vertical drive signals V1 through V8, respectively, are applied. It is to be noted that potentials formed in only one of the vertical transfer paths 144a and 144b, FIG. 3, are shown in FIGS. 9 and 11.

As shown in FIG. 9 relating to the first field, field shift pulses are applied to the vertical transfer devices V1 and V5 at the time $t_0$. Potentials are formed in the vertical transfer devices V1 and V5 at the time to in response to the vertical timing signals TG1 and TG5, respectively, and are deeper than potentials formed in response to the vertical drive signals V1 through V8. Such potentials are also formed in the vertical transfer devices V3 and V7 in FIG. 11, which relate to the second field.

As FIGS. 9 and 11 indicate, signal charges shifted to each vertical transfer path 144 are vertically transferred toward the horizontal transfer path not shown. Also, as FIGS. 7A and 7B indicate, the vertical drive signals applied to the vertical transfer devices V1 through V4 and the vertical drive signals applied to the vertical transfer devices V5 through V8, respectively, are substantially identical with each other. Stated another way, the vertical transfer devices V1 through V8 are driven by essentially four signals different in phase from each other. The signal charges, thus vertically transferred to the horizontal transfer path, are sequentially transferred on the horizontal transfer path, so that the signal charges of all pixels are read out from the image sensor 104 within one frame period.

While the photosensitive devices 140 shown in FIG. 2 each are divided into, or comprise, two photosensitive regions 140a and 140b, they each may be divided into, or comprise, three or more photosensitive regions. For example, when each photosensitive device is divided into three photosensitive regions having substantially the same photosensitive area, a third field, assigned to a third photosensitive region, may be provided after the second field in order to read out signal charges from the third photosensitive region.

FIGS. 12A through 12D, 13A through 13D, 14A through 14D and 15A through 15D demonstrate the transfer of signal charges that occur at the times (1) through (8) on a plurality of vertical transfer paths 144. More specifically, FIGS. 12A through 12D and 13A through 13D respectively correspond to the times (1) through (8) and show the transfer of signal charges representative of green and effected in the first field. FIGS. 14A through 14D and 15A through 15D, also respectively corresponding to the times (1) through (8), show the transfer of signal charges representative of red and blue and effected in the second field.

How the signal charges are processed on the horizontal transfer path will be described specifically hereinafter. In the illustrative embodiment, the FDA amplifier included in the output section determines, in accordance with the aperture value, whether or not signals output from two photosensitive regions 140a and 140b of each pixel should be mixed together in the horizontal direction. More specifically, when the aperture value is small, i.e., an F number is great, light beams incident to the individual image sensing device 140 are substantially parallel to each other. In this case, light beams incident to the photosensitive region 140a and the photosensitive region 140b are separate from each other. It follows that signals conducted from the two photosensitive regions 140a and 140b can be processed independently of each other and can be used as high-resolution signals.

By contrast, when the aperture value is great, i.e., when the F number is small, light beams are obliquely incident to the individual image receiving device 140 and are therefore focused on a position short of the photosensitive regions 140a and 140b. In this condition, light beams incident to the photosensitive region 140a and the photosensitive region 140b are not separable from each other. Consequently, signals from the photosensitive regions 140a and 140b cannot be processed independently of each other nor used as high-resolution signals.

More specifically, FIG. 3A is a fragmentary plan view showing the photosensitive regions 140a and 140b while FIGS. 3B and 3C are sections along line A-A of FIG. 3A. FIGS. 3B and 3C respectively show substantially parallel light beams 146 and oblique light beams 148 incident on the photosensitive regions 140a and 140b via the microlens ML and color filter segment CF. The divider 142 intervenes between the photosensitive regions 140a and 140b while a light intercepting layer 150 intervenes between nearby light sensing devices 140.

As shown in FIG. 3B, when the parallel light 146 is input in the event of, e.g., a telephoto shot or a shot with a small aperture or stop value, light beams incident to the photosensitive region 140a and the photosensitive region 140b are separate from each other and can be distinguished from light beams incident in the right-and-left direction. On the other hand, as shown in FIG. 3C, when the oblique light beams 148 impinge at the time of, e.g., a wide-angle shot or an open-lens shot, light beams incident to the photosensitive region 140a and light incident to the photosensitive region 140b are not separate from each other but can therefore be mixed together without any problems.

More specifically, the FDA amplifier, not shown, generates a reset pulse every other pixel when horizontal mixture is executed, but generates it every pixel as usual when horizontal mixture is not executed. FIGS. 4A and 4B respectively show two-phase pulses H1 and H2 usually fed to the horizontal transfer section that horizontally transfers signal charges input from the vertical transfer sections.

FIGS. 4C and 4D each show reset pulses Reset applied to the FDA amplifier connected to the output end of the horizontal transfer path. More specifically, as shown in FIG. 4C, when horizontal pixel mixture should be executed because oblique light beams are incident, a reset pulse is generated every other period of the two-phase pulses H1 and H2. Consequently, the FDA amplifier outputs a signal which is the sum of signal charges stored in the photosensitive regions 140a and 140b. As shown in FIG. 4D, when horizontal pixel mixture should not be executed because parallel light beams are incident, a reset pulse is generated every period of the two-phase pulses H1 and H2 like usual reset pulses.

Generally, when the aperture is small, the resolution of a lens is deteriorated due to the influence of diffraction. A high-resolution signal, directly derived from the signals output from the discrete photosensitive regions 140a and 140b, may be used to make up for such deterioration of the lens also. More specifically, FIG. 5 shows solid curves 180 and 182 representative of a lens MTF (Modulation Transfer Function) with respect to the spatial frequency of an image where an aperture is small and its open state, respectively. As shown with the curve 180, when the aperture is small, the resolution of a lens is usually deteriorated. The illustrative embodiment is capable of improving the resolution of a lens in both of the vertical and horizontal directions when the aperture is small, as indicated by a dotted curve 184 in FIG. 5. The image sensor 104 has its basic configuration described above.

Referring again to FIG. 1, the AF controller 106 translates the lenses in the lens system 102 to the optimum position thereof in accordance with information output from the focus control mechanism, which measures a range between a subject to be shot and the camera 10. At this instant, the system controller 12 produces range information by calculation and then generates a control signal representative of the amount of control therefrom. The AF controller 106 drives the focus control mechanism in response to the control signal in order to move the lenses of the lens system 102 to the optimum focal position.

As for the AE controller 108, an exposure control subsection, not shown, is included in the system controller 12 for calculating the photometric value of the field including a subject. The AE controller 108 shifts, under the control of the exposure control subsection, an iris diaphragm mechanism to thereby adjust the amount of a light beam to be incident to the image sensor 104. For photometry, part of an image signal output from the image sensor 104 is used. In this case, too, the system controller 12 calculates the amount of exposure on the basis of the photometric value and feeds the AE controller 108 with a control signal that so controls the aperture value and a shutter speed as to establish the amount of exposure calculated. The AE controller 108 controls the iris diaphragm mechanism and shutter mechanism in response to the above control signal for thereby optimizing exposure.

Further, by comparing the aperture value thus controlled with a preselected aperture value, the system controller 12 determines whether or not to execute horizontal pixel mixture, as stated earlier, and sends the result of this decision to the drive signal generator 12A and signal processor 10B. In response, the drive signal generator 10C generates reset pulses to be applied to the FDA amplifier in accordance with the aperture value.

The signal processor 10B includes a preprocessor 110, an analog-to-digital (A/D) converter 112, a signal processor 14, a buffer 116 and a compander 118. The preprocessor 110 executes correlated double sampling (CDS) to reduce noise contained in the signal charges while executing gamma correction on the signal charges, amplifies the resulting signal, and then feeds the signal to the A/D converter 112.

The A/D converter 112 samples and quantizes the analog signal output from the image sensor 104 in response to the control signal output from the system controller 12 and a clock signal output from the signal generator 120, which generates various timing signals including the above clock signal, thereby converting the analog signal to a corresponding digital signal. The digital signal is fed from the signal processor 114 to the signal processor 114.

The signal processor 114 executes automatic exposure (AE) control, white balance (WB) control, aperture correction and other signal processing in consideration of the number of pixels particular to each of two different modes, i.e., a mixture mode and a non-mixture mode. In the mixture mode, horizontal two pixels are mixed or intermingled together while, in the non-mixture mode, the two pixels are not mixed together, as stated previously. While the illustrative embodiment causes the system controller 12 to designate either one of the two modes, such a designating function may be assigned, if desired, to the mode selector 10E, which will be described specifically in detail.

A movie mode or pixel skipping mode and a camera or still picture mode are available with the illustrative embodiment and selectively executed in accordance with the position of a shutter release button 128, i.e., its half-stroke or full-stroke position. In the camera mode, image data representative of a still picture are written into a record/reproduce circuit 126 included in the signal output section 10D. The movie and camera modes are conventional with an image pickup apparatus and will not be described specifically herein. Let the following description concentrate on the mixture mode and non-mixture mode unique to the illustrative embodiment.

Various sections included in the illustrative embodiment each are informed of a particular mode to take by a control signal output from the system controller 12.

The signal processor 114 converts an image signal output from the image sensor 104 to a recordable video signal and delivers the video signal to the buffer 116. The buffer 116 amplifies the video signal to a predetermined amplitude level while, in the event of recording, controlling time. The buffer 116 outputs an image signal to the signal output section 10D or the compander 118 under the control of a record control circuit, not shown, included in the system controller 12.

The compander 118 receives, in a record mode, the image signal under the control of the controller 12 and compresses the image signal in accordance with the JPEG (Joint Photographic coding Experts Group) standard. In a reproduction mode for reading out a signal from the record/reproduce circuit 126 and reproducing it, the compander 118 expands the signal by a procedure inverse to the above record mode procedure and displays the resulting original image signal on the screen of a monitor 124.

As for the signal generator 10C, the signal generator 120 generates a synchronous signal in response to a clock signal, which is locally oscillated therein to allow the digital still camera 10 to be driven by the conventional NTSC (National Television System Committee) standard or the PAL (Phase Alternating Line) standard. The synchronous signal thus generated is fed to the signal processor 114. Further, the signal processor 120 delivers various kinds of signals including sampling signals and a write/read clock to the preprocessor 110, A/D converter 112, buffer 116 and compander 118.

More specifically, the signal generator 120 produces synchronous signals from the locally oscillated clock signal and then produces various timing signals from the synchronous signals. The timing signals include ones used to readout signal charges from the image sensor 104, e.g., a vertical timing signal that provides or defines timing for driving the vertical transfer paths, a horizontal timing signal that provides timing for driving the horizontal transfer path and timing signals for field shifts and line shifts. In addition, signals for controlling the AF controller 106 and AE controller 108 are output from the signal generator 120 although connection lines are not shown specifically in FIG. 1. While delivering such signals to the various sections, the signal generator 120 feeds the vertical timing signal and horizontal timing signal to the driver 122 also included in the drive signal generator 10C. The driver 122 generates drive signals in response to the timing signals input thereto.

As for the signal output section 10D, the monitor 124 may be implemented by a liquid crystal display (LCD) panel based on the VGA (Video Graphics Array) standard using a digital RGB (Red, Green and Blue) input interface. The record/reproduce circuit 126 is configured to record video signals fed to a magnetic recording medium, semiconductor memory or similar recording medium mounted thereon. In addition, the record/reproduce circuit 126 is capable of reading out a video signal from the above recording medium and displaying it on the screen of the monitor 124.

The mode selector 10E includes a key switch 130 in addition to the shutter release button 128 mentioned earlier. In the illustrative embodiment, the shutter release button 128 is selectively depressed to its half-stroke or first position or its full-stroke or second position by the operator. In the half-stroke position, a photometry control mode is selected, so that a signal representative of the photometry control mode is sent to the system controller 12. In the full-stroke position, the system controller 12 is provided with image pickup timing. The key switch 130, implemented as arrow keys, is operated to move a cursor in an up-and-down or a right-and-left direction on the monitor 124 for selecting an item, image or similar information, as desired. The information thus selected is also sent to the system controller 12.

As stated above, the mode selector or means 10E may be configured to allow the operator to select either one of the mixture mode and non-mixture mode on various kinds of switches.

The system controller 12, controlling the operation of the entire camera 10, includes a CPU (Central Processing Unit) not shown. The system controller 12 determines whether or not the photometry control mode is selected in response to a signal coming from the shutter release button 128, and selects the mixture mode or the non-mixture mode in accordance with the size of the aperture. Making a decision on the basis of such information, the system controller 12 controls the drive signal generator 10C in accordance with the result of the decision. The system controller 12 further includes a record control circuit, not shown, configured to control the operation of the buffer 116 and the operation of the record/reproduce circuit 126 in response to timing control signals received from the system controller 12.

Figure 16:
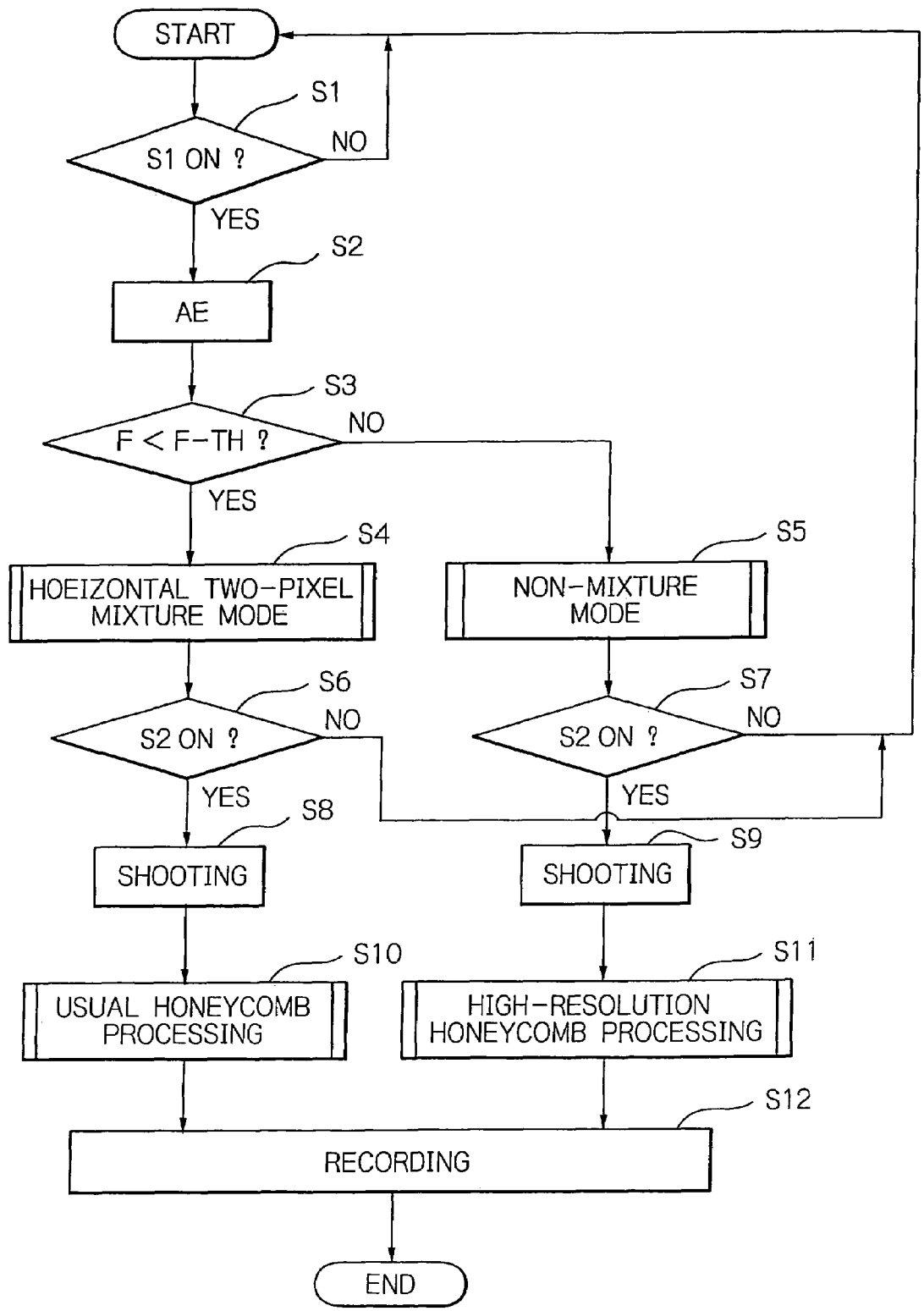
FIG. 16 is a flowchart useful for understanding a specific operation of the illustrative embodiment.

Reference will be made to FIG. 16 for describing a specific operation of the digital still camera 10 having the above configuration. First, the camera 10 executes photometry with a desired field before an actual shot. More specifically, as shown in FIG. 16, when the shutter release button 128 is determined to be in its half-stroke position or S1 ON state (YES, step S1), a photometry control mode or AE mode is established (step S2). The step S1 is repeated if otherwise.

An analog image signal produced by the image pickup section 10A through photometry is fed to the signal processing system 10B under the control of the system controller 12. The signal processor 10B converts the analog image signal to image data, or digital image signal, and delivers the image data to the system controller 12 as photometric information. In response, the system controller 12 performs an arithmetic operation with the photometric information to determine an F number or aperture value. The system controller 12 generates an AF control signal and an AE control signal and sends them to the AF controller and AE controller 108, respectively. The AF controller 106 and AE controller 108 perform control in response to the AF control signal and AE control signal, respectively, via respective mechanisms. Such adjustment is repeated in the photometry control mode.

After the F number has been determined, it is decided whether or not the F number is smaller than a preselected value F-TH (step 3). If the answer of the step S3 is positive (YES), then a horizontal two-pixel mixture mode is selected (step S4). If the answer of the step S3 is negative (NO), meaning that the F number is greater than F-TH, a non-mixture mode is selected (step S5).

In a step S6 following the step S4, whether or not the shutter release button 128 is in the full-stroke position or S2 ON state is determined (step S6) This decision is also made in a step S7 that follows the step S5. If the answer of the decision in the step S6 or S7 is YES, meaning that the operator has fully pressed the shutter release button 128 at desired pickup timing, then the image pickup section 10A shoots a desired object (step S8 or S9, respectively). Mixture stated earlier occurs in the step S8 in the horizontal transfer section, but does not occur in the step S9. If the answer of the step S6 or S7 is NO, then the procedure returns to the step S1.

An image signal output from the image pickup section 10A in the step S8 or S9 is converted to a digital signal by the A/D converter 112 of the signal processor 10B and then input to the signal processor 114. The signal processor 114 executes, in the mixture mode, honeycomb processing with the usual number of pixels (step S10) while executing, in the non-mixture mode, high-resolution honeycomb processing with a greater number of pixels (step S1). The steps S10 and S11 are identical with each other except for the number of pixels. Thereafter, the compander 118 executes compression and feeds compressed image data to the signal output section 10D. More specifically, the image data of all pixels fed under the control of the record controller included in the system controller 12 are written to the record/reproduce circuit 126 (step S12). This is the end of the specific procedure executed by the illustrative embodiment.

Figure 17A:
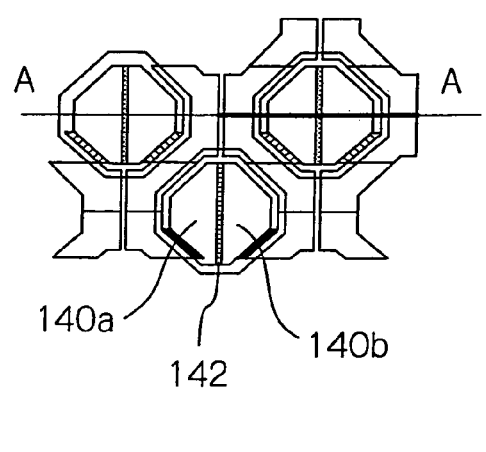
FIGS. 17A and 17B show an alternative embodiment of the present invention in which a microlens is allocated to each photosensitive region.
Figure 17B:
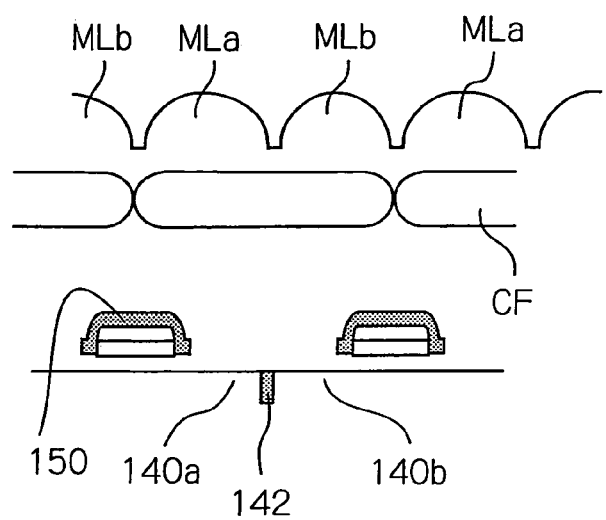

An alternative embodiment of the present invention will be described with reference to FIGS. 17A and 17B. FIG. 17A is a plan view showing the photosensitive regions 140a and 140b included in a single pixel, while FIG. 17B shows a section along line A-A of FIG. 17A. Briefly, while the previous embodiment allocates a single microlens to each pixel, the alternative embodiment to be described hereinafter allocates a single microlens to each of the couple of photosensitive regions included in a single pixel. In the illustrative embodiment, when the operator selects a continuous shoot mode available with the camera 10, signal charges read out from the photosensitive regions of each pixel are processed together. In FIG. 17, structural elements like those of the previous embodiment are designated by identical reference numerals, and detailed description thereof will not be made in order to avoid redundancy.

As shown in FIG. 17B, light incident on a microlens MLa is input to the photosensitive region 140a via a color filter segment CF. It will be seen that light incident to the photosensitive region 140a and light incident to the photosensitive region 140b are separate from each other. The crux of the illustrative embodiment is that a single microlens ML is allocated to each photosensitive region of the same pixel in order to enhance resolution of the image sensor. Stated in another way, with the illustrative embodiment, each pixel is provided with two segmental microlenses into which a single microlens is divided in order to match it to the configuration of each pixel, thereby producing a high-resolution signal at all times.

Figure 18:
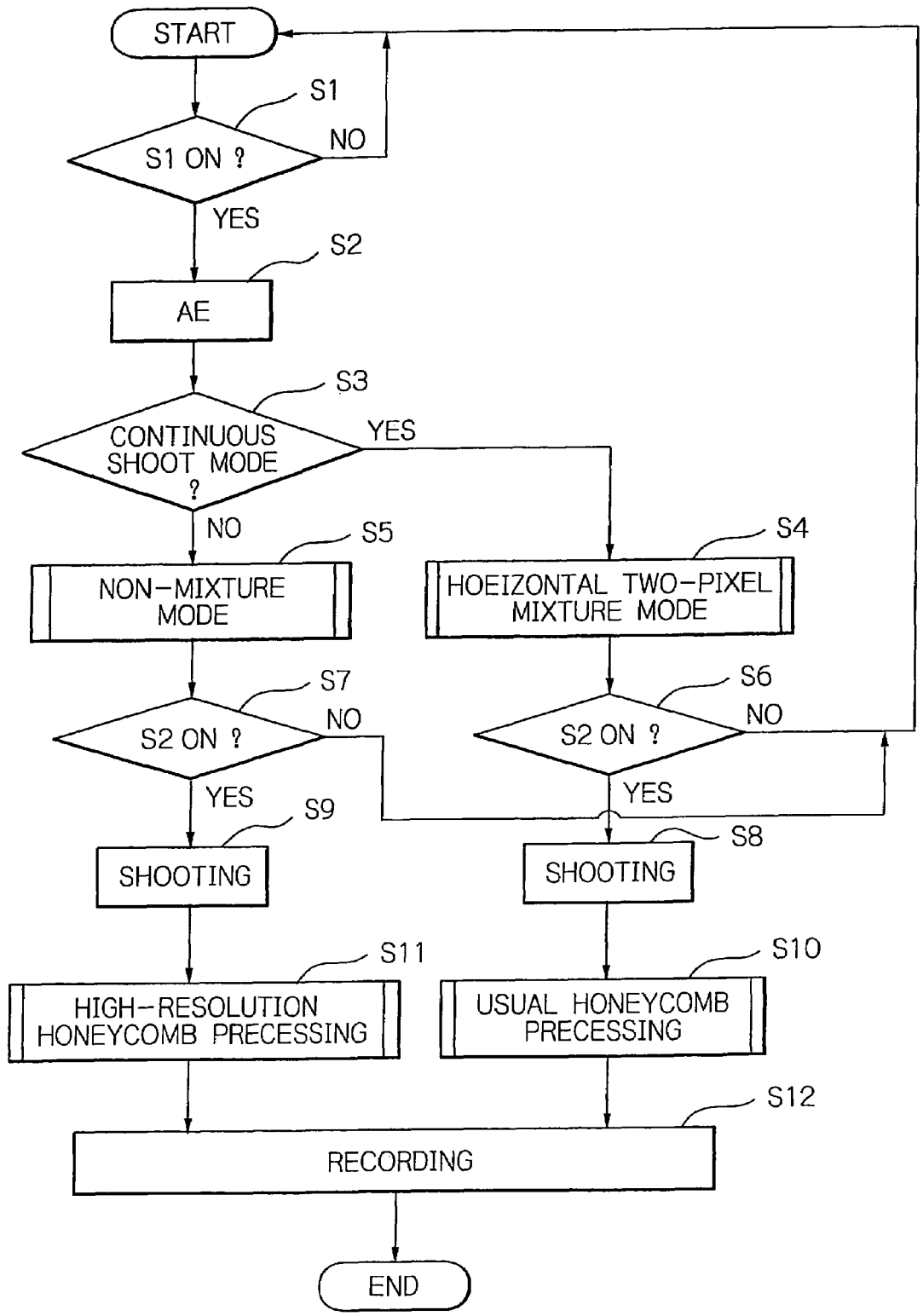
FIG. 18 is a flowchart useful for understanding a specific operation of the embodiment shown in FIGS. 17A and 17B.

FIG. 18 shows a specific operation of the alternative embodiment. As shown, when the operator inputs a particular command, e.g., a continuous shoot mode command on the camera (YES, step S31), the horizontal two-pixel mixture mode is established for giving priority to high-speed processing. In this mode operation, signal charges read out from a plurality of photosensitive regions of each pixel are processed together, i.e., pixels adjoining each other in the horizontal direction are added together.

Still another alternative embodiment of the present invention will be described hereinafter. While the embodiments described above is operable only in the interlace read mode, the embodiment to be described hereinafter is operable in the progressive read mode in addition to the interlace read mode, as needed. To implement progressive read mode, an even number of transfer electrodes are positioned between pixels adjoining each other on each vertical transfer path in the direction of transfer. One of the two photosensitive regions of each pixel is connected to an odd-numbered transfer electrode while the other photosensitive region is connected to an even-numbered transfer electrode.

In the progressive read mode, a read signal is applied to either one of the odd- and even-numbered transfer electrodes in order to read out a signal charge from the photosensitive region to the vertical transfer path. More specifically, while interlace reading reads out signal charges from both of the photosensitive regions 140a and 140b, progressive reading reads out a signal charge from only one of them, which is the photosensitive region 140b connected to the odd transfer electrode in the illustrative embodiment. In progressive reading, signal charges are read out from all photosensitive devices 140.

Figure 19:
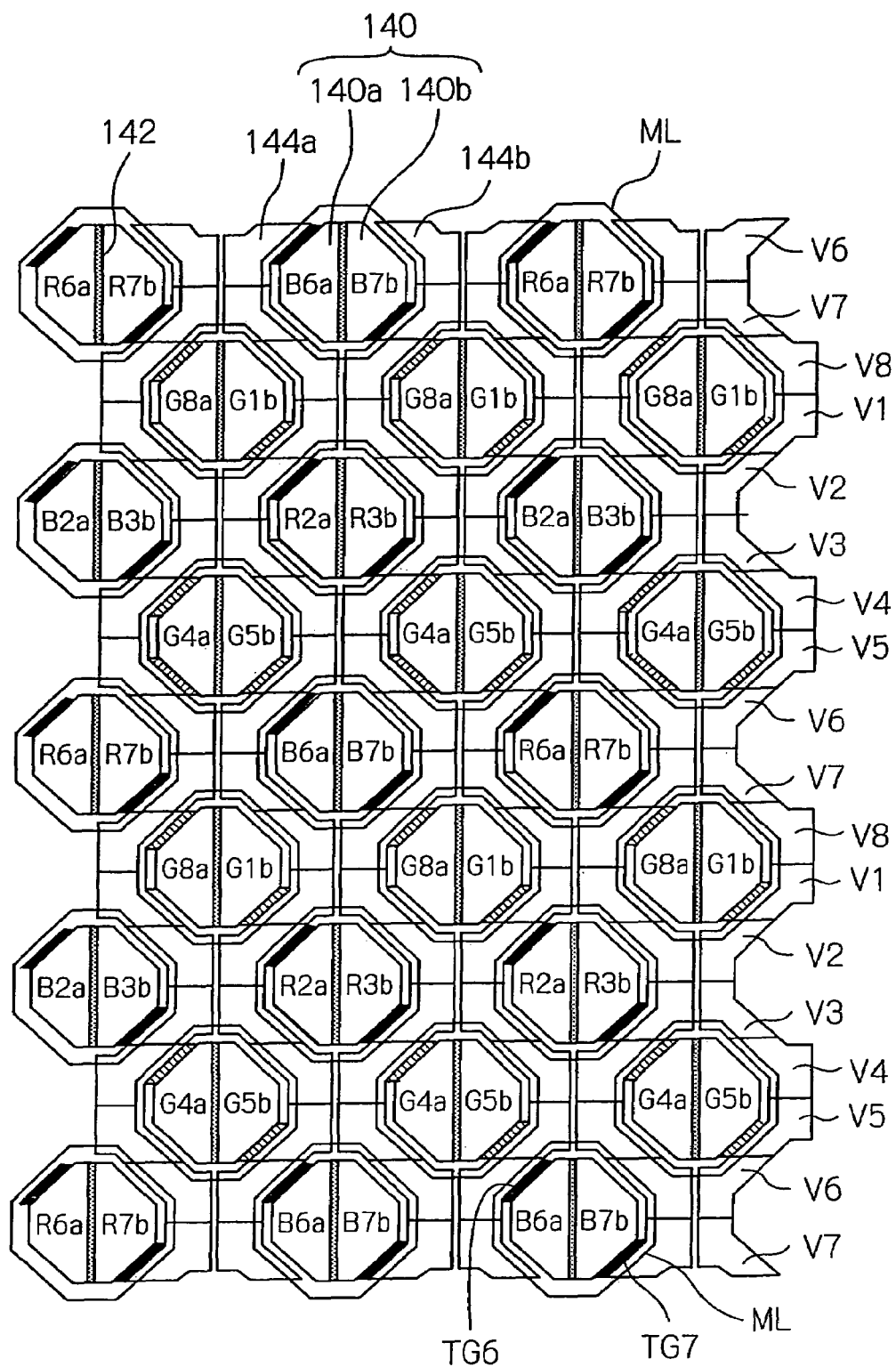
FIG. 19 is a fragmentary plan view showing an image sensor representative of a still another alternative embodiment of the present invention.

FIG. 19 shows an image sensor included in the illustrative embodiment. As shown, the photosensitive devices 140 are bidimensionally arranged in rows and columns. Also shown in FIG. 19 are the color filter segments CF, microlenses ML, dividers 142, signal read gates TG and electrodes V1 through V8 arranged on the vertical transfer paths 144.

The photosensitive area of each photosensitive device 140 is partitioned into a couple of photosensitive regions 140a and 140b by a divider 142 in the transfer direction of the vertical transfer path 144, i.e., in the downward direction in FIG. 19. The two photosensitive regions 140a and 140b have substantially the same photosensitive area, i.e., both are substantially equal in area to each other. The photosensitive devices 140 are arranged in a honeycomb pattern. Numerals 1 through 8 included in labels G1, B2, B3, R2, R3, G4, G5, B6, B7, R7 and G8 respectively correspond to identification numbers assigned to the vertical transfer electrodes. The color filter segments CF shown in FIG. 19 are arranged in a G-stripe, RB-full checkerboard pattern.

In the interlace read mode, signal charges are read out from all of the photosensitive regions G1*b*, G4*a*, G5*b* and G8*a*, which are located at the positions of green pixels, in the first field. Subsequently, in the second field, signal charges are read out from the photosensitive regions R2*a*, R3*b*, R6*a*, R7*b*, B2*a*, B3*b*, B6*a* and B7*b*, which are located at the positions of red pixels and blue pixels. To implement such interlace reading, the signal read gates TG associated with the photosensitive regions 140*a* and the signal read gates TG associated with the photosensitive regions 140*b* are oriented toward the even electrodes and odd electrodes, respectively.

With the interlace read mode stated above, it is possible to make the width of each vertical transfer path smaller than with the progressive read mode customarily practiced by an image pickup system using a honeycomb arrangement.

Figure 20A:
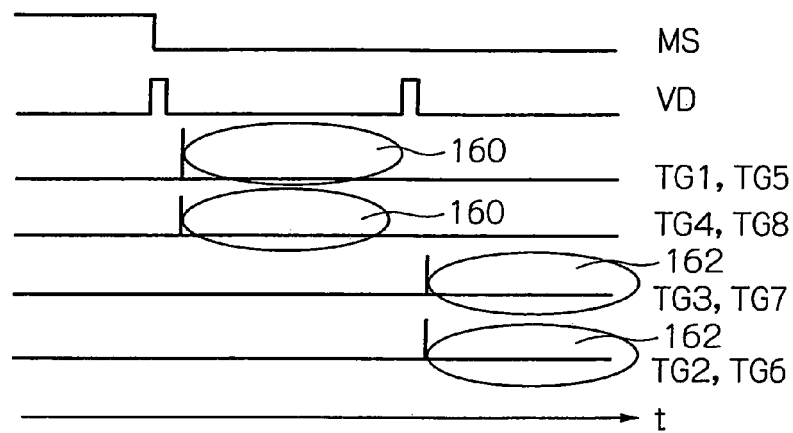
FIGS. 20A and 20B are timing charts showing pulses to be applied to the image sensor of FIG. 19.

FIG. 20A shows various signals generated in the interlace read mode in the instant alternative embodiment. As shown, to readout signal charges from the photosensitive regions 140*a* and 140*b* of each pixel, the signal generator 120, FIG. 1, generates a signal MS for closing the mechanical shutter and a vertical synchronous signal VD synchronous to the signal MS. Further, the signal generator 120 generates vertical timing signals TG1 through TG8 synchronous to the vertical synchronous signal VD, respectively, and to be fed to the signal read gates TG.

In each vertical synchronizing period shown in FIG. 20A, the vertical timing signals TG1, TG4, TG5 and TG8 go high in the first field 160 while the vertical timing signals TG2, TG3, TG6 and TG7 go high in the second field 162. Although the vertical timing signals TG1 through TG8 are different from those shown in FIG. 6, the vertical drive signals V1 through V8 are substantially identical with those shown in FIGS. 7A and 7B.

In the first field 160 shown in FIG. 20A, when the transfer gates are turned on, i.e. open, signal charges are read out from only the photosensitive devices corresponding in position to the transfer devices V1, V4, V5 and V8, i.e., green pixels. A field shift is not executed until the next vertical synchronous signal VD has been fed. After a field shift, the vertical drive signals V1 through V8 are sequentially fed. In the second field 162, when the transfer gates are turned on, signal charges are read out from only the photosensitive devices corresponding in position to the transfer devices V2, V3, V6 and V7, i.e., red pixels and blue pixels. Again, after a field shift, the vertical drive signals V1 through V8 are sequentially fed.

Figure 20B:
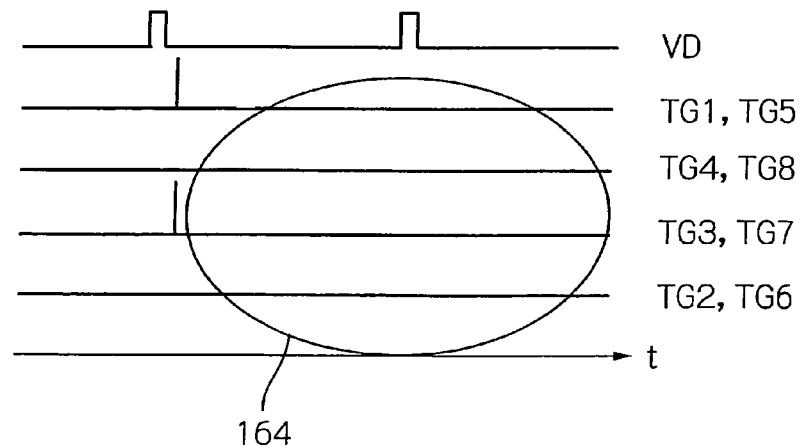

FIG. 20B shows various signals generated in the progressive read mode. As shown, the signal generator 120, FIG. 1, generates vertical timing signals TG1 through TG8, which is synchronous to a vertical synchronous signal VD, to be fed to the signal read gates TG. In each vertical synchronizing period shown in FIG. 20B, the vertical timing signals TG1, TG3, TG5 and TG7 go high while the vertical timing signals TG2, TG4, TG6 and TG8 remain in the low level thereof. It is to be noted that in the progressive read mode the mechanical shutter is held in its open position, so that the signal MS remains in its high level and is therefore not shown in FIG. 20B.

Although the vertical timing signals TG1 through TG8 differ from the vertical timing signals shown in FIG. 20A, the vertical drive signals V1 through V8 are substantially identical with those shown in FIG. 20A. In FIG. 20B, when the transfer gates are turned on, signal charges are read out from only the photosensitive devices corresponding in position to the transfer devices V1, V3, V5 and V7. In this case, a field shift is not executed until the next shot. During all-pixel transfer period 164 that follows a field shift, the vertical drive signals V1 through V8 are sequentially fed.

When an ultrahigh-speed shutter or similar electronic shutter is required, progressive reading may be executed by applying pulses only to the odd or the even signal read gates, allowing a signal charge to be read out from only one of two photosensitive regions of each pixel. This is because exposure speed is more important than picture resolution in the case of ultrahigh-speed shutter, and therefore the limited amount of output signal charges available with progressive reading is not questionable. Moreover, progressive reading differs from the interlace reading in that it does not read out signal charges in consecutive fields and is therefore free from thermal saturation diffusion.

Figure 21:
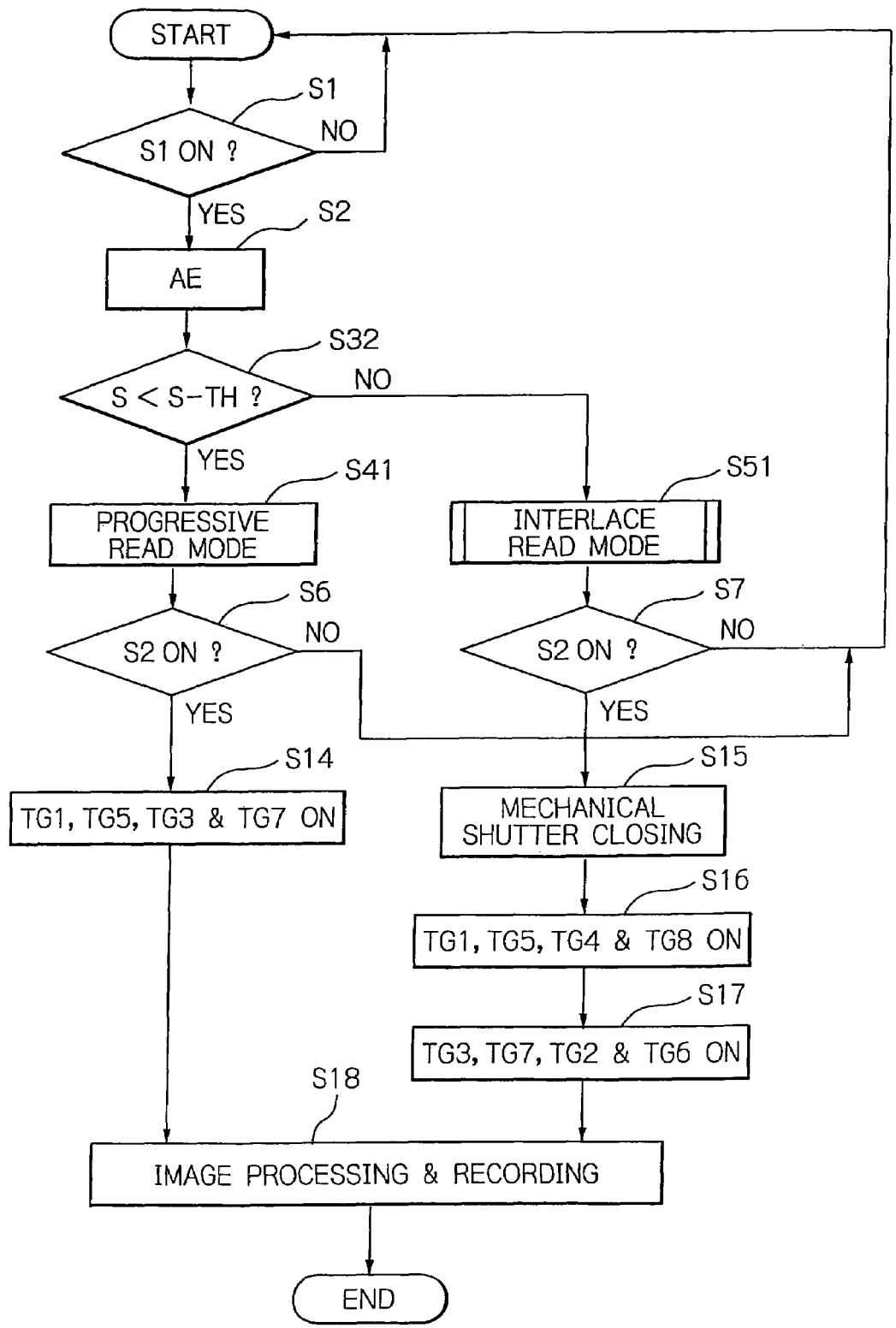
FIG. 21 is a flowchart useful for understanding a specific operation of the embodiment shown in FIG. 19.

FIG. 21 demonstrates a specific operation of the illustrative embodiment also practicable with the configuration shown in FIG. 1. First, the camera 10 executes photometry with a desired field before an actual shot. More specifically, as shown in FIG. 21, when the shutter release button 128 is determined to be in the half-stroke position or S1 ON state (YES, step S1), a photometry control mode or AE mode is established (step S2). The step S1 is repeated if otherwise.

An analog image signal generated by the image pickup section 10A through photometry is fed to the signal processing system 10B under the control of the system controller 12. The signal processor 10B converts the analog image signal to image data, or digital image signal, and delivers the image data to the system controller 12 as photometric information. In the present alternative embodiment, the system controller 12 performs an arithmetic operation with the photometric information so as to determine a shutter speed S. This is repeated thereafter.

Subsequently, whether or not the shutter speed S is lower than a preselected shutter speed S-TH is determined (step S32). If the answer of the step S32 is YES, then the progressive read mode is selected (step S41) while, if it is NO, the interlace read mode is selected (step S51).

Subsequently, if the answer of the step S6 or the step S7 is YES, then operator depresses the shutter release button 128 to its full-stroke position at desired pickup timing, causing the image pickup section 10A to pickup the desired object. Consequently, in the progressive read mode, the vertical timing signals TG1, TG3, TG5 and TG7 go high or positive (step S14). In this mode operation, the mechanical shutter is not closed. Unnecessary signal charges, if any, are discarded through an overflow drain system. On the other hand, in the interlace read mode, after the mechanical shutter has been closed (step S15), the vertical timing signals TG1, TG5, TG4 and TG8 are caused to go high in the first field in order to read out signal charges and transfer them in the vertical direction (step S16). Thereafter, to effect transfer in the second field, the vertical timing signals TG3, TG7, TG2 and TG6 are caused to go high in order to read out signal charges and then transfer them in the vertical direction (step S17).

In the signal processor 10B, honeycomb processing with a usual number of pixels or high-resolution honeycomb processing with a greater number of pixels is effected in the progressive read mode or the interlace read mode, respectively, (step S18); the difference is only the number of pixels.

A further alternative embodiment of the present invention will be described hereinafter. Briefly, in the further alternative embodiment, the dividers of the photosensitive devices each extend generally in a direction dependent on the direction of a line connecting the center 186, FIG. 22, of the photosensitive cell array and each of the photosensitive devices. For example, the dividers may extend radially outward away from the center of the photosensitive cell array.

Figure 22:
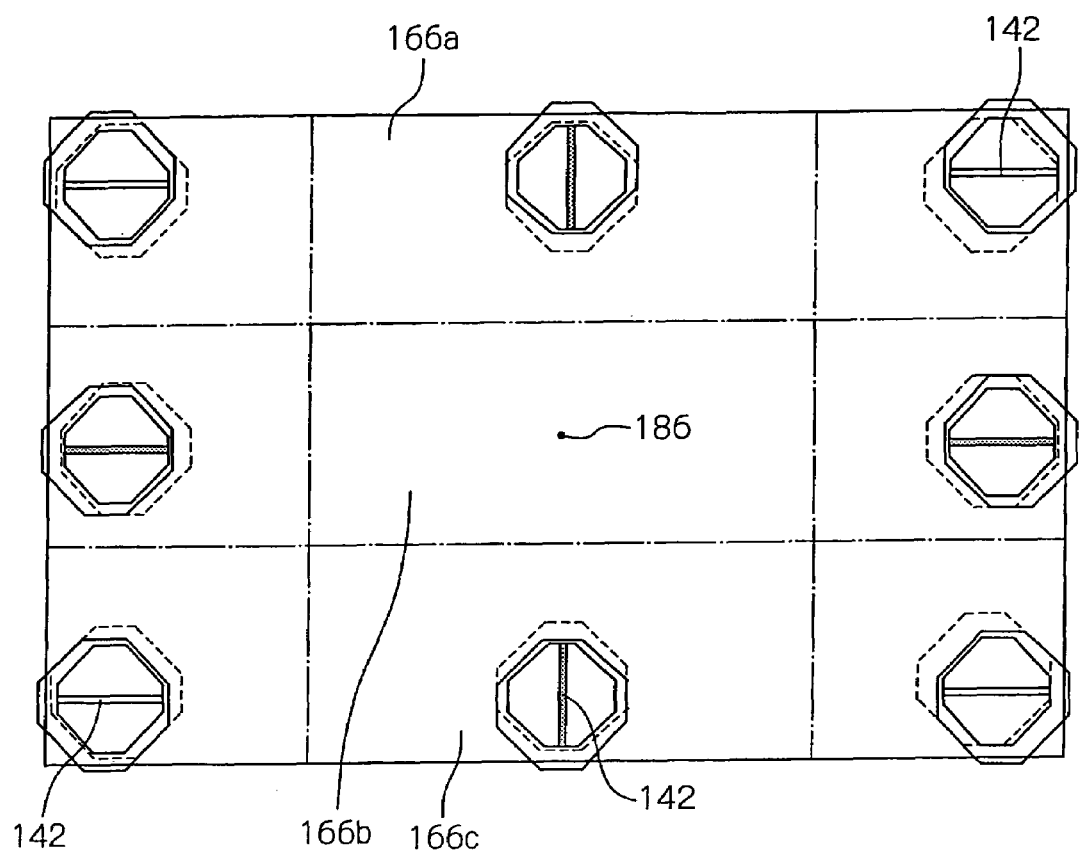
FIG. 22 shows a further alternative embodiment of the present invention.
Figure 23:
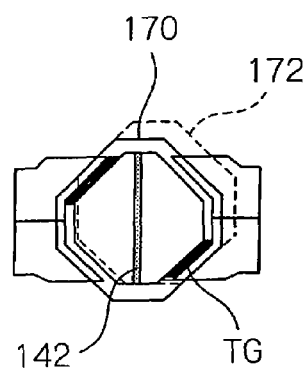
FIG. 23 shows different focus areas available with each photosensitive device included in the embodiment of FIG. 22.

FIG. 22 shows a specific arrangement of the dividers 142 available with the further alternative embodiment and generally similar to the radial arrangement mentioned above. As shown, the photosensitive cell array is divided into three in both of the vertical and horizontal directions, i.e., divided into nine subareas in total. The dividers 142 extend vertically in center subareas 166*a*, 166*b* and 166*c* while extending horizontally in the other subareas. Why the dividers 142 in the subareas at opposite sides of the center subareas extend horizontally is that they insure even receipt of light because light incident on each image sensing device presumably contains many horizontal components. FIG. 23 shows a solid line 170 representative of a focusing area in a wide-angle mode and a dotted line 172 representative of a telephoto mode. The solid line 170 and the dotted line 172 are also depicted in FIG. 22.

As stated above, the instant alternative embodiment allows each photosensitive device to be divided in any desired direction for thereby enhancing the shading characteristic of the photosensitive device. The enhanced shading characteristic, in turn, uniforms the saturation capacities of the divided photosensitive regions of each pixel.

In the illustrative embodiments shown and described, each photosensitive device or cells includes a plurality of photosensitive regions having substantially the same photosensitive area as each other. Alternatively, each photosensitive device may include a plurality of photosensitive regions that store substantially the same amount of charge for reasons to be described hereinafter.

In the illustrative embodiments, a plurality of photosensitive regions of each pixel are the same in photosensitive area as each other for the purpose of equalizing the quantity of light incident thereto. Generally, the amount of stored charge is considered to be the product of the amount of light or photons incident to a photosensitive region by a photoelectric conversion efficiency while the amount of light to be incident on the photosensitive region is substantially dependent upon the area of the photosensitive region. Therefore, the same photosensitive area may usually be considered to mean the same amount of electric charge to be stored in the photosensitive regions of each pixel. However, to cause the photosensitive regions to more accurately store the same amount of charge, it is preferable, when consideration is given to the fact that the amount of stored charge is the product of the above two factors, to make the amounts of charges to be stored in the photosensitive regions substantially the same.

In summary, it will be seen that the present invention provides a solid-state image pickup apparatus having various unprecedented advantages to be described hereinafter.

Electric charge stored in a single photosensitive device is distributed to a plurality of transfer paths. This successfully reduces the width of the individual transfer path, i.e., increases a photosensitive area or saturation amount of charge for a single photosensitive device, thereby achieving substantially the same advantages as the conventional interlace reading system.

All green signals, generally greater in the amount of signal charge, are read out in a first field while red and blue signals, smaller in the amount of signal charge than the green signals, are read out in the second field. It is therefore not necessary to take account of the influence of thermal saturation diffusion, making OFD modulation unnecessary during reading.

Signal charges, belonging to the same pixel, can be added in the horizontal direction on a second transfer path, e.g., a horizontal CCD path, so that the number of pixels output from the second transfer path is the same as the number of pixels available with the conventional interlace read mode.

Assume that a plurality of photosensitive regions exist below a single microlens, and that parallel light beams are incident on the microlens when the angle of field is smaller than that of a standard lens or when the aperture is smaller. Then, horizontal pixel addition is not executed for the purpose of using the resulting signal as a high-resolution signal to thereby effectively increase resolution in the horizontal direction. On the other hand, assume that oblique light beams are incident on the microlens when the angle of field is greater than that of a standard lens or when the aperture is open or closer to its full open state. Then, pixels are added in, e.g., the horizontal direction.

Resolution is further enhanced when a single microlens is allocated to each of the divided photosensitive regions.

A progressive read mode is available in addition to the interlace read mode, as desired. The progressive read mode allows an electronic shutter to operate even when ISO sensitivity is low, i.e., the aperture is open. In addition, control is simple because the method of driving transfer electrodes does not have to be varied between the interlace read mode and the progressive read mode.

The readout gate can be located in any desired direction on a photosensitive device, so that the location of the read out gate can be determined according to the direction of a divider. Thus, the shading characteristic of the individual photosensitive device is improved, so that the saturation capacities of the photosensitive regions of each pixel can be made equal.

The photosensitive area of the photosensitive region read in a following field, e.g., a second field is greater than that of the photosensitive region read in a preceding field, e.g., a first field. This successfully makes up for a loss in the charge read out in the second field due to thermal saturation diffusion. With respect to the photosensitive area of the photosensitive region read in the second field, it is preferable to decide so as to make up for thermal saturation diffusion. It is possible to make the smaller photosensitive area equal to the area of the photosensitive area shown in FIG. 2 on which the photosensitive areas of the photosensitive regions are the same. In this case the width of the vertical transfer path may be narrower than that of the vertical transfer path in FIG. 2. However, this makes more up for a loss in the charge read out in the second field due to thermal saturation diffusion.

In the present invention, one of the plurality of photosensitive regions is able to store a greater amount of charge than at least another of the photosensitive regions. In this case, the amount of charge stored is defined, so that it is possible to makes more precisely up for a loss in the amount of charge read out in the second field due to thermal saturation diffusion.

The entire disclosure of Japanese patent application Nos. 2004-278405 and 2005-135183 filed on Sep. 24, 2004 and May 6, 2005, respectively, including the specifications, claims, accompanying drawings and abstracts of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An image pickup apparatus, comprising:
a plurality of photosensitive devices each forming a pixel and producing a signal charge responsive to an incident light, said plurality of photosensitive devices being bi-dimensionally arranged in rows and columns to form a photosensitive cell array, each of said plurality of photosensitive devices comprising a first photosensitive region and a second photosensitive region having substantially a same photosensitive area as the first photosensitive region;
a plurality of first transfer paths arranged in a direction of the columns for transferring the signal charges stored in said plurality of photosensitive devices; and
a plurality of microlenses each being allocated to a particular pixel for condensing incident light on a corresponding one of said plurality of photosensitive devices which is located at a position of the particular pixel,
wherein when light beams incident on said apparatus are substantially parallel with each other, signal charges read out from said first and second photosensitive regions of each pixel are processed independently of each other,
said first and second photosensitive regions being opposite to each other in a direction of the rows,
each of said plurality of first transfer paths being arranged between adjacent ones of the columns of pixels,
each of said plurality of first transfer paths being connected to the first photosensitive region of one of said plurality of photosensitive devices which is on a first transfer path of said first transfer paths, and being connected to the second photosensitive region of another of said plurality of photosensitive devices which is on the first transfer path, and
wherein said first transfer path transfers the signal charges stored in said first photosensitive region of the one photosensitive device together with the signal charges stored in said second photosensitive region of the another photosensitive device.

2. An image pickup apparatus, comprising:
a plurality of photosensitive devices each forming a pixel and producing a signal charge responsive to an incident light, said plurality of photosensitive devices being bi-dimensionally arranged in rows and columns to form a photosensitive cell array, each of said plurality of photosensitive devices comprising a first photosensitive region and a second photosensitive region having substantially a same photosensitive area as the first photosensitive region;
a plurality of first transfer paths arranged in a direction of the columns for transferring the signal charges stored in said plurality of photosensitive devices; and
a plurality of microlenses each being allocated to a particular pixel for condensing incident light on a corresponding one of said plurality of photosensitive devices which is located at a position of the particular pixel,
wherein when light beams incident on said apparatus are substantially not parallel with each other, signal charges read our from said first and second photosensitive regions of each pixel are processed together,
said first and second photosensitive regions being opposite to each other in a direction of the rows,
each of said plurality of first transfer paths being arranged between adjacent ones of the columns of pixels,
each of said plurality of first transfer paths being connected to the first photosensitive region of one of said plurality of photosensitive devices which is on a first transfer path of said first transfer paths, and being connected to the second photosensitive region of another of said plurality of photosensitive devices which is on the first transfer path,
wherein said first transfer path transfers the signal charges stored in said first photosensitive region of the one photosensitive device together with the signal charges stored in said second photosensitive region of the another photosensitive device.

3. An image pickup apparatus, comprising:
a plurality of photosensitive devices each forming a pixel and producing a signal charge responsive to an incident light, said plurality of photosensitive devices being bi-dimensionally arranged in rows and columns to form a photosensitive cell array, each of said plurality of photosensitive devices comprising a first photosensitive region and a second photosensitive region having substantially a same photosensitive area as the first photosensitive region; and
a plurality of first transfer paths arranged in a direction of the columns for transferring the signal charges stored in said plurality of photosensitive devices,
said first and second photosensitive regions being opposite to each other in line with a direction of the rows,
each of said plurality of first transfer paths being arranged between adjacent ones of the columns of pixels,
each of said plurality of first transfer paths being connected to the first photosensitive region of one of said plurality of photosensitive devices which is on a first transfer path of said first transfer paths, and being connected to the second photosensitive region of another of said plurality of photosensitive devices which is on the first transfer path,
wherein said first transfer path transfers the signal charges stored in said first photosensitive region of the one photosensitive device together with the signal charges stored in said second photosensitive region of the another photosensitive device, and
wherein for each of said columns placed between an adjacent column and another adjacent column, a left side transfer path of said first transfer paths transfers signal charges from the first photosensitive region of a first photosensitive device, from the first photosensitive region of a second photosensitive device, placed adjacent to the first photosensitive device in said each of said columns, and from the second photosensitive region of an adjacent photosensitive device, placed in said adjacent column and between the first photosensitive device and the second photosensitive device, and a right side transfer path of said first transfer paths transfers signal charges from the second photosensitive region of the first photosensitive device, from the second photosensitive region of the second photosensitive device, and from the first photosensitive region of another adjacent photosensitive device, placed in said another adjacent column and between the first photosensitive device and the second photosensitive device.

4. The apparatus in accordance with claim 3, wherein said first and second photosensitive regions of each of said plurality of photosensitive devices have a same shape.

5. The apparatus in accordance with claim 3, wherein said first and second photosensitive regions of each of said plurality of photosensitive devices are symmetrical to each other with respect to the direction of the columns.

6. The apparatus in accordance with claim 3, further comprising color filter segments each being allocated to a particular pixel for separating light incident on said apparatus into red, green and blue, each of which corresponds to a particular pixel;

wherein the signal charges are read out in an interlace read mode such that signal charges corresponding to green and signal charges corresponding to red and blue are sequentially read out in an order of a first field and a second field, respectively.

7. The apparatus in accordance with claim 3, further comprising:

color filter segments each being allocated to a particular pixel for separating light incident on said apparatus into red, green and blue, each of which corresponds to a particular pixel; and a second transfer path for receiving the signal charges transferred from said first transfer paths to further transfer the signal charges received;

wherein the signal charges are read out in an interlace read mode such that signal charges stored in said plurality of photosensitive regions of a same pixel are read out in a same field and then mixed on said second transfer path, whereby signal charges are totalized on a pixel basis.

8. The apparatus in accordance with claim 3, further comprising a plurality of microlenses each being allocated to a particular one of said photosensitive regions of a particular pixel for condensing incident light on said particular photosensitive region.

9. The apparatus in accordance with claim 8, wherein signal charges read out from said first and second photosensitive regions of each pixel are processed together.

10. The apparatus in accordance with claim 3, wherein signal charges are read out from the plurality of pixels in a progressive read mode.

11. The apparatus in accordance with claim 3, wherein each of said first transfer paths comprises an even number of transfer electrodes positioned between pixels adjoining each other in the direction of the columns, one of said first and second photosensitive regions of each pixel being connected to an odd-numbered one of said even number of transfer electrodes while an other of said photosensitive regions is connected to an even-numbered one of said even number of transfer electrodes.

12. The apparatus in accordance with claim 11, wherein a read signal is applied to either one of said odd-numbered transfer electrode and said even-numbered transfer electrode for reading out a signal charge stored in the photosensitive region to said first transfer path, whereby a progressive read mode operation is executed.

13. The apparatus in accordance with claim 3, further comprising a divider for separating said first and second photosensitive regions from each other of each photosensitive device, said divider extending in a direction dependent on a direction of a line connecting a substantial center of the photosensitive cell array and corresponding one of said photosensitive devices.

14. The apparatus in accordance with claim 3, wherein said plurality of first transfer paths, respectively connected to said first and second photosensitive regions of each photosensitive device, are arranged at both sides of said photosensitive device.

15. An image pickup apparatus, comprising:

a plurality of photosensitive devices each forming a pixel and producing a signal charge responsive to an incident light, said plurality of photosensitive devices being bi-dimensionally arranged in rows and columns to form a photosensitive cell array, each of said plurality of photosensitive devices comprising a first photosensitive region and a second photosensitive region capable of storing substantially a same amount of signal charge; and a plurality of first transfer paths arranged in a direction of the columns for transferring the signal charges stored in said plurality of photosensitive devices, said first and second photosensitive regions being opposite to each other in line with a direction of the rows, each of said plurality of first transfer paths being arranged between adjacent ones of the columns of pixels, each of said plurality of first transfer paths being connected to the first photosensitive region of one of said plurality of photosensitive devices which is on a first transfer path of said first transfer paths, and being connected to the second photosensitive region of another of said plurality of photosensitive devices which is on the first transfer path, wherein said first transfer path transfers the signal charges stored in said first photosensitive region of the one photosensitive device together with the signal charges stored in said second photosensitive region of the another photosensitive device, and wherein for each of said columns placed between an adjacent column and another adjacent column, a left side transfer path of said first transfer paths transfers signal charges front the first photosensitive region of a first photosensitive device, from the first photosensitive region of a second photosensitive device, placed adjacent to the first photosensitive device in said each of said columns, and from the second photosensitive region of an adjacent photosensitive device, placed in said adjacent column and between the first photosensitive device and the second photosensitive device, and a right side transfer path of said first transfer paths transfers signal charges from the second photosensitive region of the first photosensitive device, from the second photosensitive region of the second photosensitive device, and from the first photosensitive region of another adjacent photosensitive device, placed in said another adjacent column and between the first photosensitive device and the second photosensitive device.

16. An image pickup apparatus, comprising:

a plurality of photosensitive devices each forming a pixel and producing a signal charge responsive to an incident light, said plurality of photosensitive devices being bi-dimensionally arranged in rows and columns to form a photosensitive cell array, each of said plurality of photosensitive devices comprising a first photosensitive region and a second photosensitive region which is larger in photosensitive area than said first photosensitive region, wherein in an interlace read mode signal charges stored in said first photosensitive region and said second photosensitive region are sequentially read out in an order of a first field and a second field, respectively; and a plurality of first transfer paths ranged in a direction of the columns for transferring the signal charges stored in said plurality of photosensitive devices, said first and second photosensitive regions being opposite to each other in line with a direction of the rows, each of said plurality of first transfer paths being arranged between adjacent ones of the columns of pixels, each of said plurality of first transfer paths being connected to the first photosensitive region of one of said plurality of photosensitive devices which is on a first transfer path of said first transfer paths, and being connected to the second photosensitive region of another of said plurality of photosensitive devices which is on the first transfer path, wherein said first transfer path transfers the signal charges stored in said first photosensitive region of the one photosensitive device together with the signal charges stored in said second photosensitive region of the another photosensitive device, and wherein for each of said columns placed between an adjacent column and another adjacent column, a left side transfer path of said first transfer paths transfers signal charges from the first photosensitive region of a first photosensitive device, from the first photosensitive region of a second photosensitive device, placed adjacent to the first photosensitive device in said each of said columns, and from the second photosensitive region of an adjacent photosensitive device, placed in said adjacent column and between the first photosensitive device and the second photosensitive device, and a right side transfer path of said first transfer paths transfers signal charges from the second photosensitive region of the first photosensitive device, from the second photosensitive region of the second photosensitive device, and from the first photosensitive region of another adjacent photosensitive device, placed in said another adjacent column and between the first photosensitive device and the second photosensitive device.

17. An image pickup apparatus, comprising:

a plurality of photosensitive devices each forming a pixel and producing a signal charge responsive to an incident light, said plurality of photosensitive devices being bi-dimensionally arranged in rows and columns to form a photosensitive cell array, each of said plurality of photosensitive devices comprising a first photosensitive region and a second photosensitive region which is larger in capacity to store signal charges than said first photosensitive region, wherein in an interlace read mode signal charges stored in said first photosensitive region and said second photosensitive region are sequentially read out in an order of a first field and a second field, respectively; and a plurality of first transfer paths arranged in a direction of the columns for transferring the signal charges stored in said plurality of photosensitive devices, said first and second photosensitive regions being opposite to each other in line with a direction of the rows, each of said plurality of first transfer paths being arranged between adjacent ones of the columns of pixels, each of said plurality of first transfer paths being connected to the first photosensitive region of one of said plurality of photosensitive devices which is on a first transfer path of said first transfer paths, and being connected to the second photosensitive region of another of said plurality of photosensitive devices which is on the first transfer path, wherein said first transfer path transfers the signal charges stored in said first photosensitive region of the one photosensitive device together with the signal charges stored in said second photosensitive region of the another photosensitive device, and wherein for each of said columns placed between an adjacent column and another adjacent column, a left side transfer path of said first transfer paths transfers signal charges from the first photosensitive region of a first photosensitive device, from the first photosensitive region of a second photosensitive device, placed adjacent to the first photosensitive device in said each of said columns, and from the second photosensitive region of an adjacent photosensitive device, placed in said adjacent column and between the first photosensitive device and the second photosensitive device, and a right side transfer path of said first transfer paths transfers signal charges from the second photosensitive region of the first photosensitive device, from the second photosensitive region of the second photosensitive device, and from the first photosensitive region of another adjacent photosensitive device, placed in said another adjacent column and between the first photosensitive device and the second photosensitive device.

* * * * *